United States Patent
Shim

(10) Patent No.: US 9,467,853 B2
(45) Date of Patent: Oct. 11, 2016

(54) SERVER FOR MANAGING HOME APPLIANCE AND SYSTEM INCLUDING THE SAME

(71) Applicant: LG ELECTRONICS INC., Seoul (KR)

(72) Inventor: Jonghoon Shim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/517,299

(22) Filed: Oct. 17, 2014

(65) Prior Publication Data

US 2015/0111539 A1    Apr. 23, 2015

Related U.S. Application Data

(60) Provisional application No. 61/892,182, filed on Oct. 17, 2013.

(51) Int. Cl.
  *H04W 12/06* (2009.01)
  *H04L 29/08* (2006.01)
  *H04L 12/28* (2006.01)

(52) U.S. Cl.
  CPC .......... *H04W 12/06* (2013.01); *H04L 12/2803* (2013.01); *H04L 67/125* (2013.01); *H04L 67/14* (2013.01)

(58) Field of Classification Search
  None
  See application file for complete search history.

(56) References Cited

U.S. PATENT DOCUMENTS

| | | | |
|---|---|---|---|
| 2013/0325939 A1* | 12/2013 | Shim | G06Q 50/10 709/203 |
| 2014/0081433 A1* | 3/2014 | Cheong | H04L 12/2809 700/90 |
| 2014/0087661 A1* | 3/2014 | Kim | H04B 5/0025 455/41.1 |
| 2014/0148147 A1* | 5/2014 | Tak | H04M 1/72533 455/420 |
| 2014/0156081 A1* | 6/2014 | Ha | D06F 33/02 700/275 |
| 2014/0195383 A1* | 7/2014 | Kim | G06Q 30/0633 705/26.62 |
| 2014/0197934 A1* | 7/2014 | Ha | H04L 12/12 340/12.5 |

* cited by examiner

*Primary Examiner* — Diane Mizrahi
(74) *Attorney, Agent, or Firm* — KED & Associates, LLP

(57) ABSTRACT

A server includes a memory, a communication module configured to exchange data with a mobile terminal or a home appliance, and a processor configured to receive login information from the mobile terminal based on a first communication mode, to perform login based on the login information, to receive a session maintenance request from the mobile terminal based on a second communication mode after login, and to initialize a session duration according to the session maintenance request. Thus, it is possible to control the home appliance in real time via the server.

20 Claims, 26 Drawing Sheets

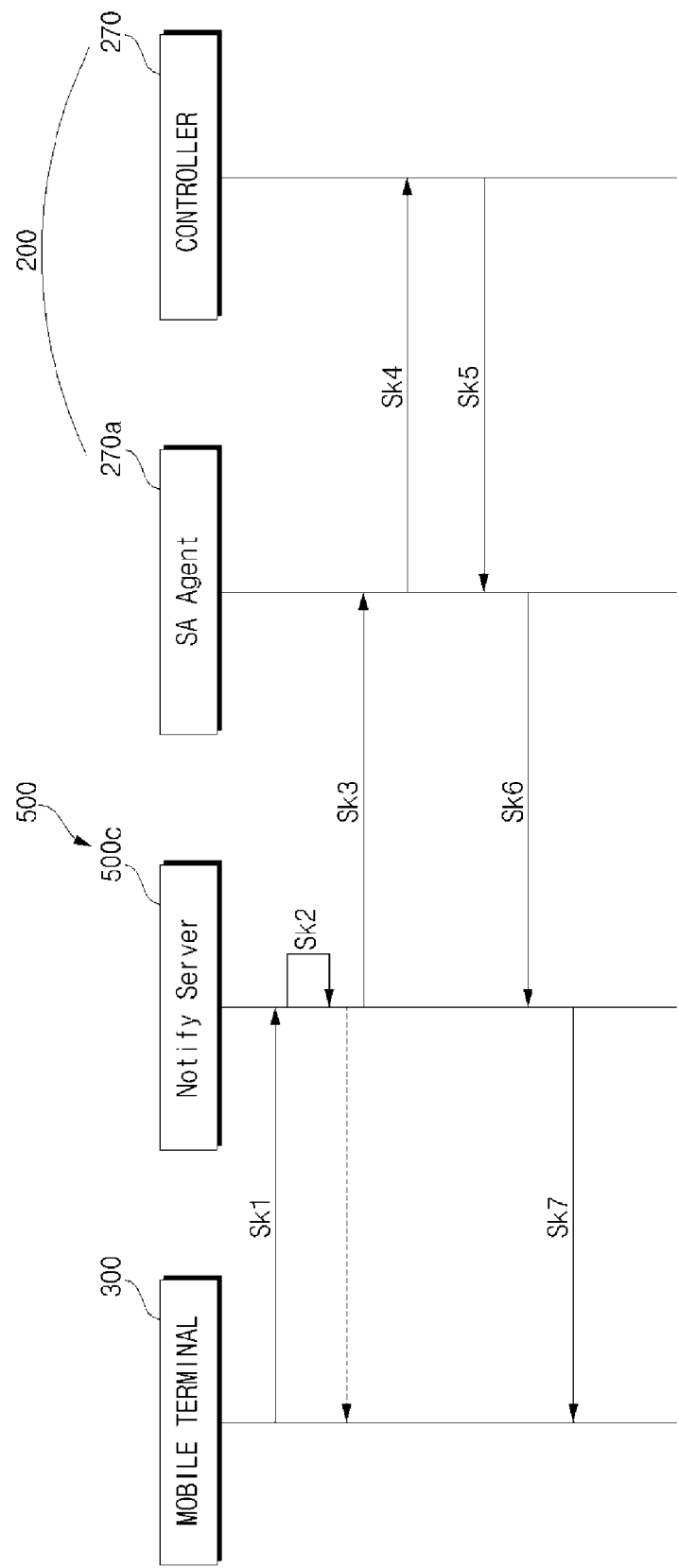

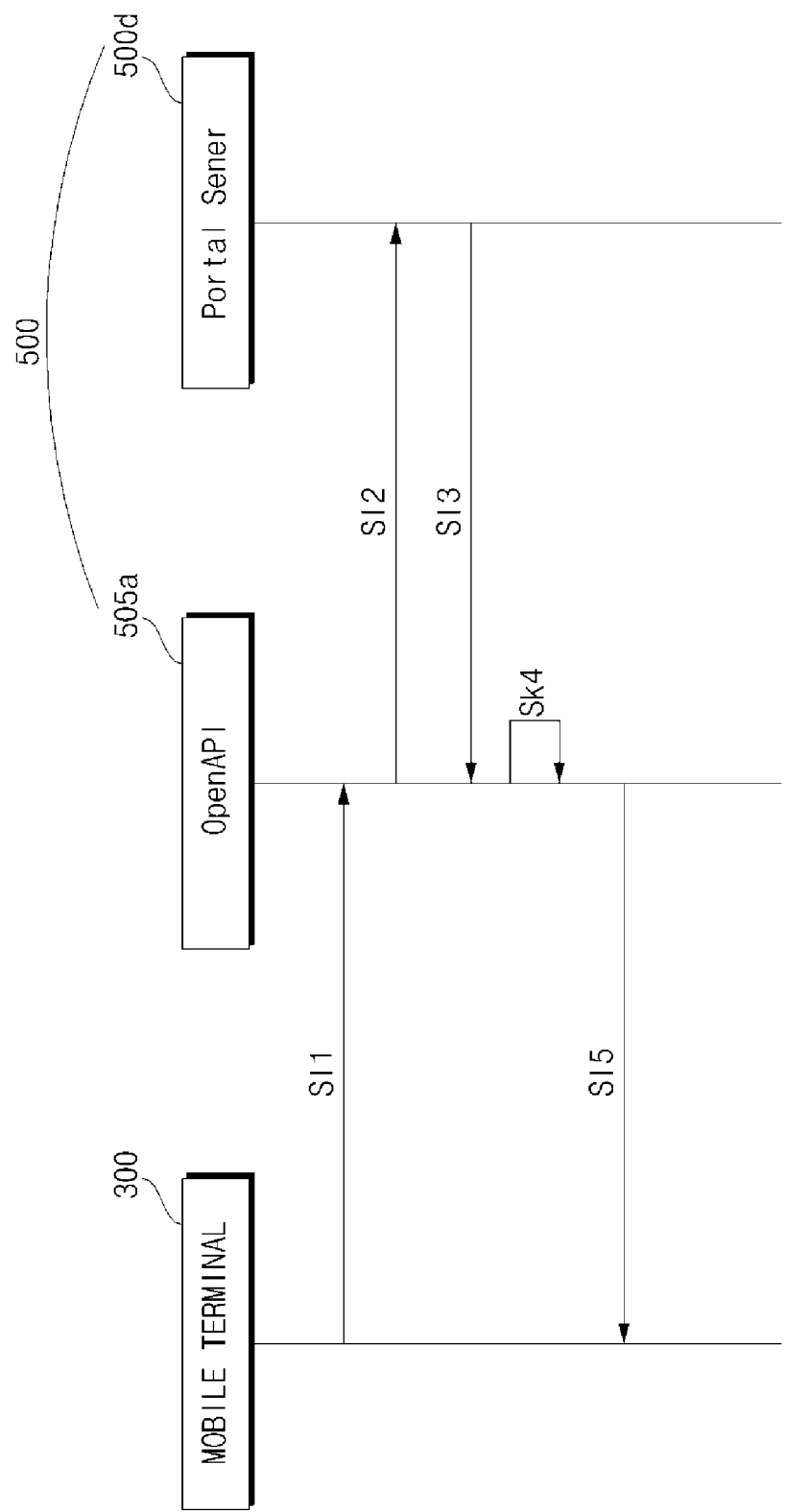

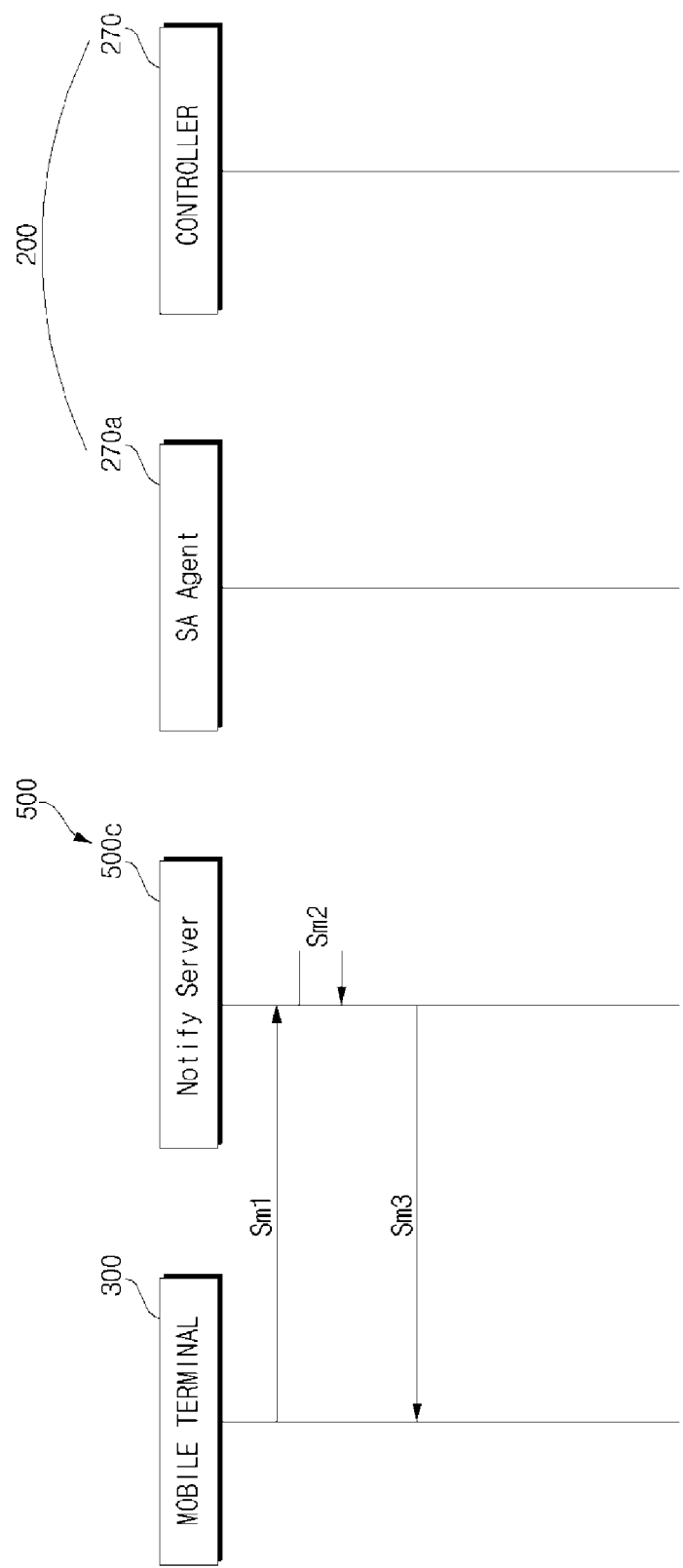

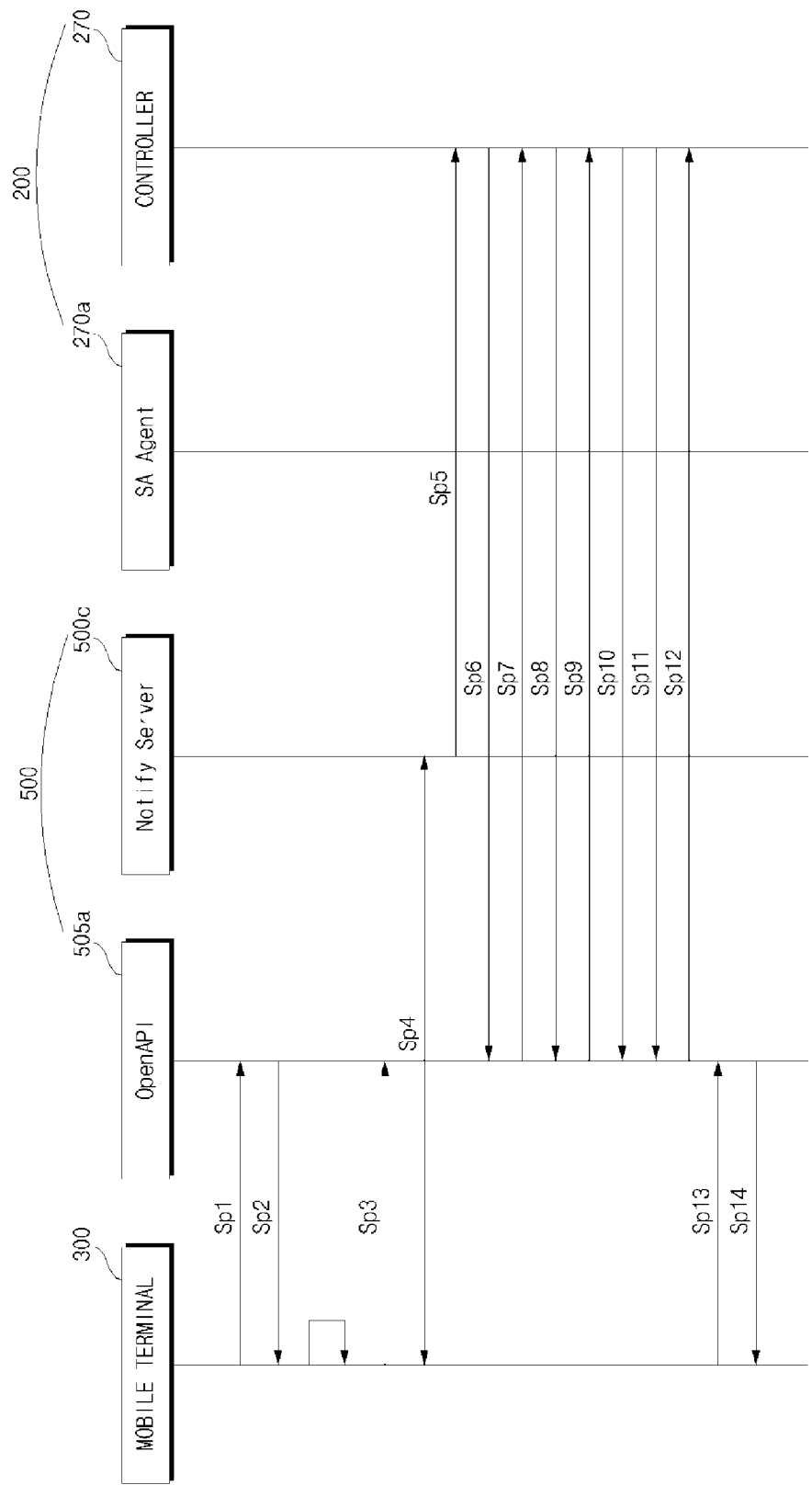

SERVER FOR MANAGING HOME APPLIANCE AND SYSTEM INCLUDING THE SAME

CROSS-REFERENCE TO RELATED APPLICATION

This application claims the priority benefit of prior U.S. Provisional Patent Application No. 61/892,182 filed on Oct. 17, 2013 in the USPTO, whose entire disclosure is hereby incorporated by reference.

BACKGROUND

1. Field

The present disclosure relates to a server for managing a home appliance and a system including the same, and more particularly, to a server capable of performing real-time control and a system including the same.

2. Background

Among home appliances provided in a building, a refrigerator stores food, a washing machine processes laundry, an air conditioner adjusts indoor temperature, and a cooker cooks food. As various communication methods have been developed, a variety of research in hopes of increasing user convenience in terms of communication with a home appliance has been conducted.

BRIEF DESCRIPTION OF THE DRAWINGS

The embodiments will be described in detail with reference to the following drawings in which like reference numerals refer to like elements wherein:

FIG. 14 is a diagram showing a signal flow for remote control of a home appliance;

FIG. 15 is a diagram showing a signal flow for logging in to a server;

FIG. 16 is a diagram showing a signal flow for a connection state request for a home appliance;

FIG. 17C is a diagram showing a signal flow for updating content; and

DETAILED DESCRIPTION

Figure 1:
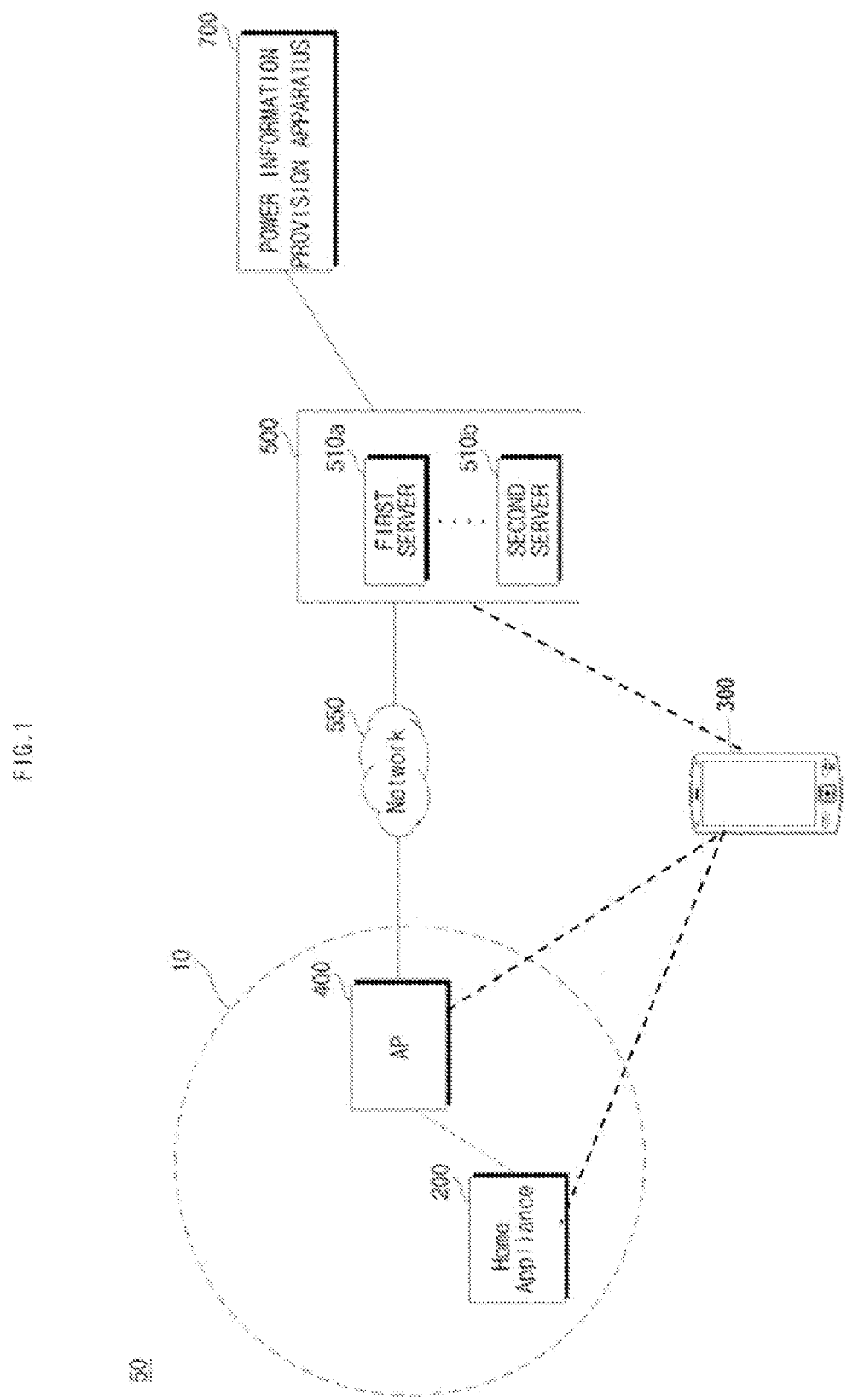
FIG. 1 is a diagram showing the configuration of a home appliance system according to an embodiment of the present disclosure.

FIG. 1 is a diagram showing an example of a communication system according to an embodiment of the present disclosure. The communication system 50 may include a home appliance 200, an access point (AP) apparatus 400, a server 500, a network 550 and a mobile terminal 600.

The home appliance 200 may be an electric device for a user and may include a refrigerator (200a of FIG. 2), a washing machine (200b of FIG. 2), an air conditioner (200c of FIG. 2), a cooker (200d of FIG. 2) and a cleaner (200e of FIG. 2), etc. The home appliance 200 includes a communication unit (not shown) and may exchange data with electric devices in an internal network 10 or electric devices connectable over an external network 550. For data exchange, the communication unit (not shown) may exchange data with the AP apparatus 400 by wire or wirelessly.

The AP apparatus 400 may provide the internal network 10 and, more particularly, a wireless network to adjacent electric devices. The AP apparatus 400 may allocate radio channels according to a predetermined communication method to the electric devices in the internal network 10 and perform wireless data communication via the channels. The predetermined communication method may be one of Wi-Fi communication, Bluetooth communication, and/or Zig-Bee communication. The mobile terminal 300, which may be located in the internal network 10, may communicate with the home appliance 200 via the AP apparatus 400, thereby performing monitoring and remote control of the home appliance 200.

The AP apparatus 400 may perform data communication with an external electric device via the external network 550 in addition to the internal network 10. For example, the AP apparatus 400 may perform wireless data communication with an externally located mobile terminal via the external network 550.

The mobile terminal 300, which may also move to be located in the external network 550, may communicate with the home appliance 200 via the external network 550 and the AP apparatus 400, thereby performing monitoring, remote control, smart diagnosis, etc. of the home appliance. As another example, the AP apparatus 400 may perform wireless data communication with the externally located server via the external network 550.

The server 500 may store firmware information and operation information (course information) of the home appliance 200 and register product information of the home appliance. For example, the server 500 may be operated by a manufacturer or vendor of the home appliance 200. As another example, the server 500 may be operated by a public application store operator.

The server 500 receives login information from the mobile terminal 300 based on a first communication mode, performs login based on the login information, receives a session maintenance request from the mobile terminal 300 based on a second communication mode after login, and initiates a session duration according to the session maintenance request. The server 500 provides information about the registered home appliance 200 to the mobile terminal 300. Thus, real-time control of the home appliance via the server 500 is possible.

The server 500 assigns control rights to the first logged-in user or mobile terminal 300 and transmits a message indicating "no control rights" to the other users or mobile terminals 300, such that control rights are assigned to one user or mobile terminal 300. The server 500 provides monitoring data to all connected users or mobile terminals 300, such that all the users or mobile terminals 300 perform monitoring regardless of the control rights.

The server 500 may transmit, to the home appliance 200, any one of a control command, a monitoring command, a diagnosis command and a software download command for the home appliance 200 from the mobile terminal 300, thereby providing user convenience. Detailed functions of the server 500 will be described in greater detail with reference to FIGS. 4 and 6.

Figure 2A:
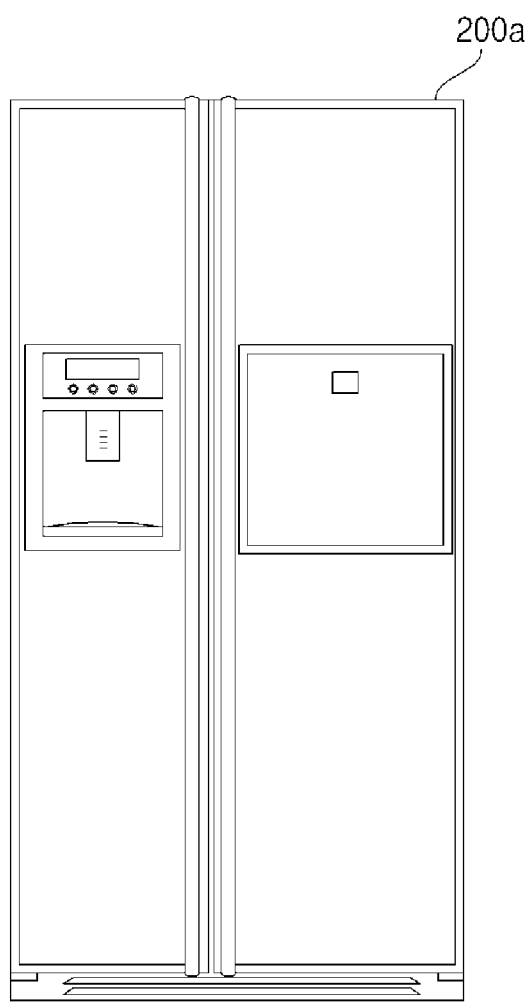
FIGS. 2A to 2E are diagrams illustrating various examples of a home appliance.
Figure 2B:
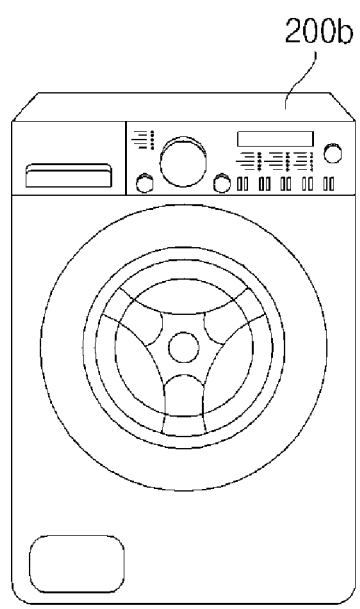
Figure 2C:
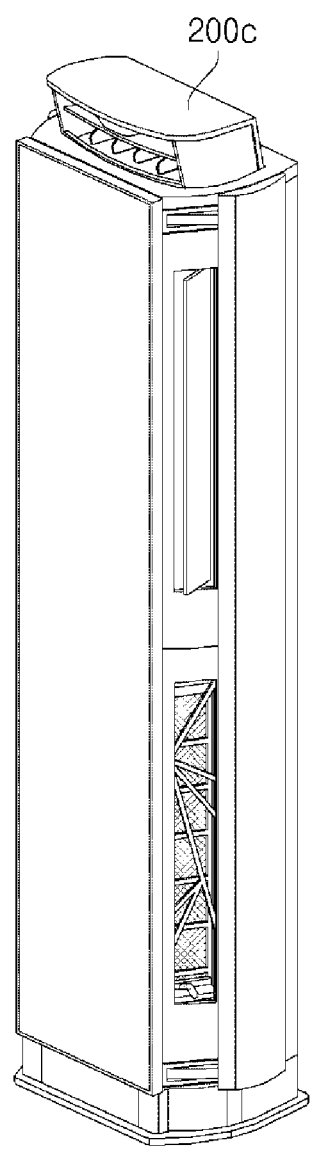
Figure 2D:
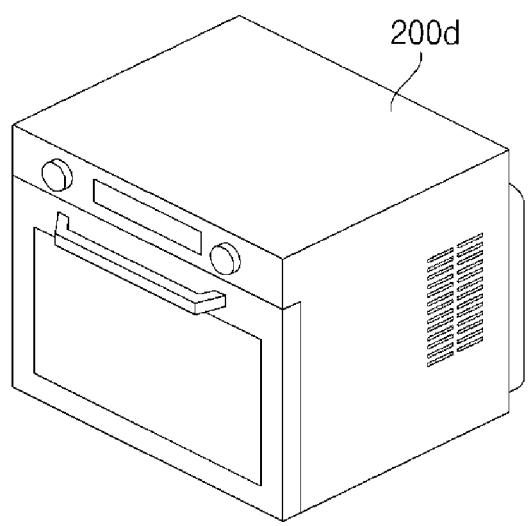
Figure 2E:
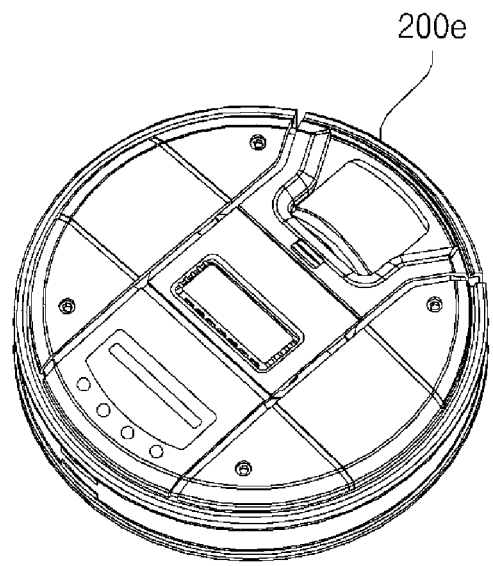

FIG. 2A shows a refrigerator 200*a*, FIG. 2B shows a washing machine 200*b*, FIG. 2C shows an air conditioner 200*c*, FIG. 2D shows a cooker 200*d*, and FIG. 2*e* shows a robot cleaner 200*e*.

Figure 3A:
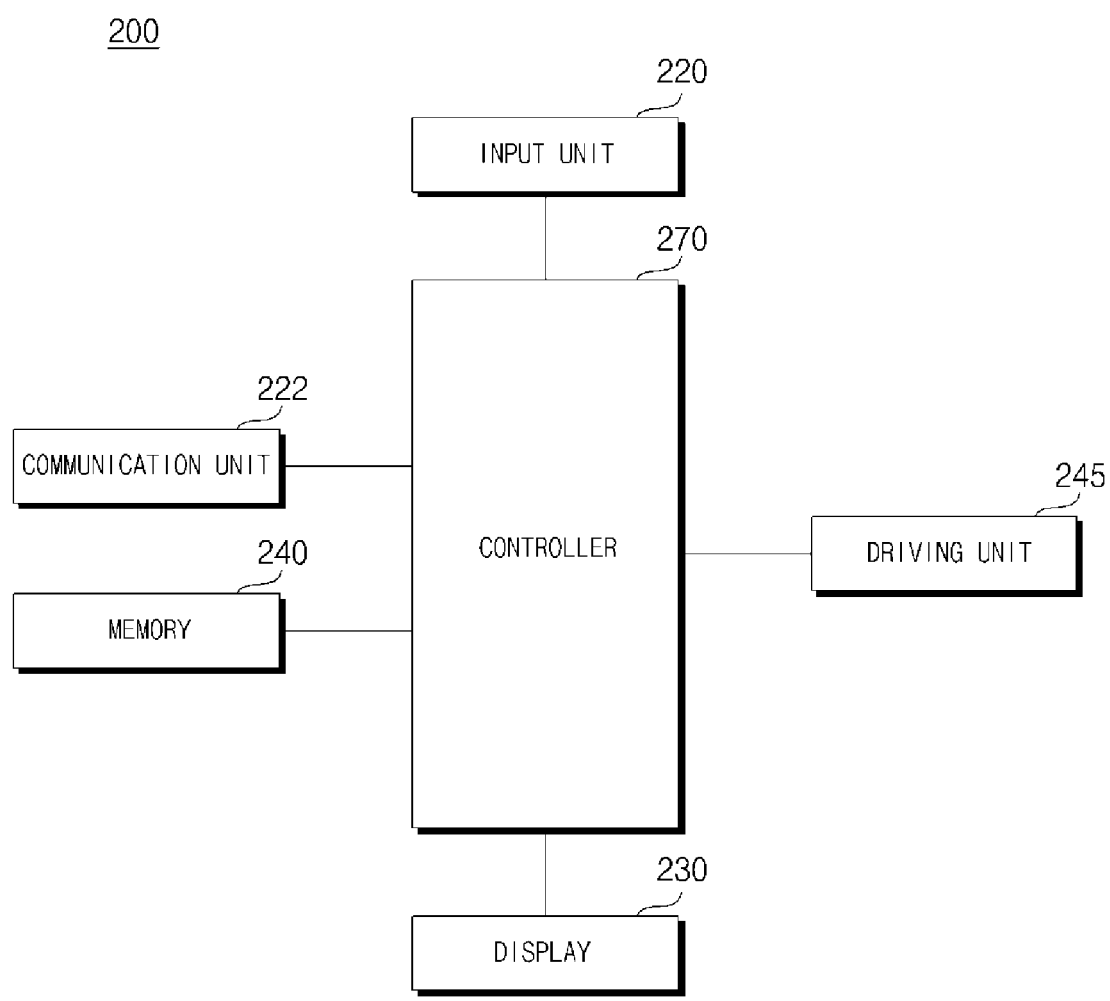
FIG. 3A is a block diagram showing the internal configuration of a home appliance of FIG. 1.

FIG. 3A is a block diagram showing the internal configuration of the home appliance of FIG. 1. The home appliance 200 may include an input unit 220 for user input, a display 230 for displaying an operation state of the home appliance, a communication unit 222 for performing communication with another external device, a driving unit 245 for driving the home appliance and a controller 270 for controlling internal units such as the driving unit 245.

For example, if the home appliance is a refrigerator, the driving unit 245 may include a refrigerating compartment driving unit for driving a refrigerating compartment fan for supplying cooled air to a refrigerating compartment, a freezer compartment driving unit for driving a freezer compartment fan for supplying cooled air to a freezer compartment, and a compressor driving unit for driving a compressor for compressing a refrigerant.

As another example, if the home appliance is a washing machine, the driving unit 245 may include a driving unit for driving a drum or a tub.

As another example, if the home appliance is an air conditioner, the driving unit 245 may include a compressor driving unit for driving a compressor in an outdoor unit, an outdoor fan driving unit for driving a fan of the outdoor unit for heat exchange, and an indoor fan driving unit for driving a fan of an indoor unit for heat exchange.

As another example, if the home appliance is a cooker, the driving unit 245 may include a microwave driving unit for outputting microwaves into a cavity.

As another example, if the home appliance is a cleaner, the driving unit 245 may include a fan motor driving unit for air suction.

The communication unit 222 may include at least a near field communication (NFC) module 217 capable of performing NFC, a Wi-Fi module, a Bluetooth module, a Zig-Bee module, etc. The communication unit 222 may access the AP apparatus 400, access the server 510 via the AP apparatus 400 or receive a power information signal from the server 510.

The controller 270 may control the driving unit 245 based on the power information signal received via the communication unit 222. In addition, a memory 240 for storing data in the home appliance may be further included.

Figure 3B:
FIG. 3B is a block diagram showing the internal configuration of an example of a communication unit of FIG. 3A.

FIG. 3B is a block diagram showing the internal configuration of a communication unit of FIG. 3A. The communication unit 222 may include a first interface 272 for data communication with the AP apparatus 400 located in the home and a second interface 274 for data communication with the server and, more particularly, a first server 510*a*. For data communication with the first server 510*a*, if a data structure of a predetermined format is defined, the first interface 272 may perform data conversion according to the defined data structure such that data exchange is possible. For data conversion, the first interface 272 may include an agent for the first server 510*a*.

When Wi-Fi communication with the AP apparatus 400 is performed, the communication unit 222 may include a Wi-Fi communication module and the second interface 274 may include a Wi-Fi application for data exchange between the controller 270 and the AP apparatus 400. Thus, data conversion, etc. may be performed, which will be described with reference to FIG. 7.

Figure 4:
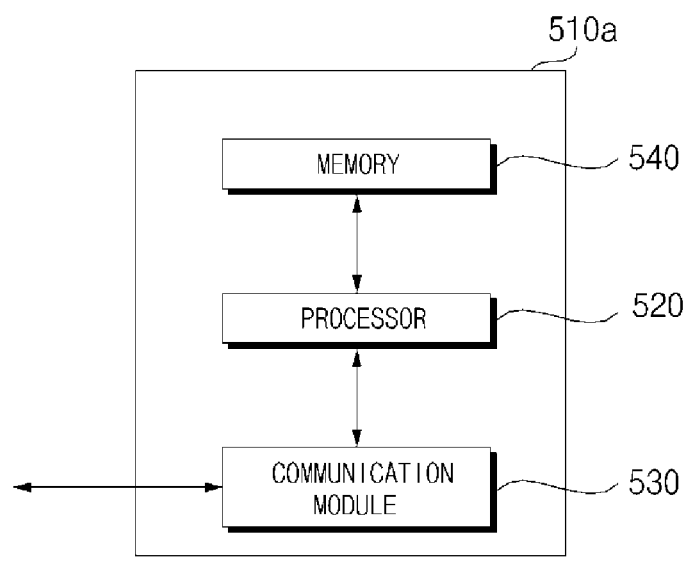
FIG. 4 is a block diagram showing the internal configuration of a server of FIG. 1.

FIG. 4 is a block diagram showing the internal configuration of the server of FIG. 1. The server 500 may include a communication module 530, a memory 540 and a processor 520. The server 500 may be managed by a manufacturer of the home appliance 200 or an operator of an application store related to the home appliance 200. The communication module 530 exchanges data with the mobile terminal 300 or the home appliance 200.

The communication module 530 may receive home appliance related information and, more particularly, home appliance product information from the mobile terminal 300. The communication module 530 may transmit product information registration result information of the received home appliance product information to the mobile terminal 300.

The communication module 530 may include an Internet module or a mobile communication module. The memory 540 may store the received home appliance product information and include the received product information for product registration of the home appliance.

The processor 520 may perform overall control of the server 500. The processor 520 may control generation of the product registration result information of the home appliance when receiving the product information of the home appliance from the mobile terminal 300. The processor may control transmission of the generated product registration result information to the mobile terminal 300.

As another example, if the home appliance related information is power consumption information of the home appliance, the processor 520 may control transmission of power information, such as power price information, on peak time power information, off peak time power information, real-time power information, etc. stored in the memory 540, to the mobile terminal 300.

The processor 520 receives login information from the mobile terminal 300 based on a first communication mode, performs login based on the login information, receives a session maintenance request from the mobile terminal 300 based on a second communication mode after login, and initiates a session duration according to the session maintenance request.

The processor 520 may search for a registered home appliance in the memory 540 and control transmission of product information, a notify server address for TCP connection and port information to the mobile terminal 300, after login.

The processor 520 may check whether the home appliance requested by the mobile terminal 300 has been registered or connected to the server according to a home appliance connection state request from the mobile terminal 300 and control transmission of result information to the mobile terminal 300.

The processor 520 may check the connection state of the home appliance according to a remote control request from the mobile terminal 300 and control transmission of a remote control command to the home appliance based on a second communication mode.

The processor 520 may transmit a notify message for software update to the home appliance according to a software update request from the mobile terminal 300 and control transmission of URL information for software download to the home appliance according to a software download request from the home appliance.

The processor 520 may control transmission of a command to the home appliance according to a camera start request or a camera stop request from the mobile terminal 300 and the memory 540 may store media data of a camera received from the home appliance. At this time, the processor 520 may control transmission of the media data to the mobile terminal 300.

The processor 520 may perform authentication processing based on login information transmission and transmission of file data stored in the memory 540, based on the first communication mode, and perform control command delivery and result reception and monitoring data transmission and result reception, based on the second communication mode.

The first communication mode is based on an open application programming interface (API) and the second communication mode is based on a real-time interface. The processor 520 may control transmission of a message indicating that the home appliance is operating to the mobile terminal in the first communication mode, upon management of a specific home appliance.

The processor 520 assigns control rights to a user or mobile terminal which first performs login, and controls transmission of a message indicating "no control rights" to the other users or mobile terminals 300, via the second communication mode. If the user or mobile terminal 300 having the control rights logs out, the processor 520 may assign the control rights to a user or mobile terminal 300 which has first requested a control command among the other users or mobile terminals 300.

The processor 520 may control transmission of monitoring data to all connected users or mobile terminals. The processor 520 may control transmission of a session ID to the mobile terminal 300, after login. The processor 520 may control transmission of the session ID and a device list of a manageable home appliance to the mobile terminal 300, after login.

Figure 5:
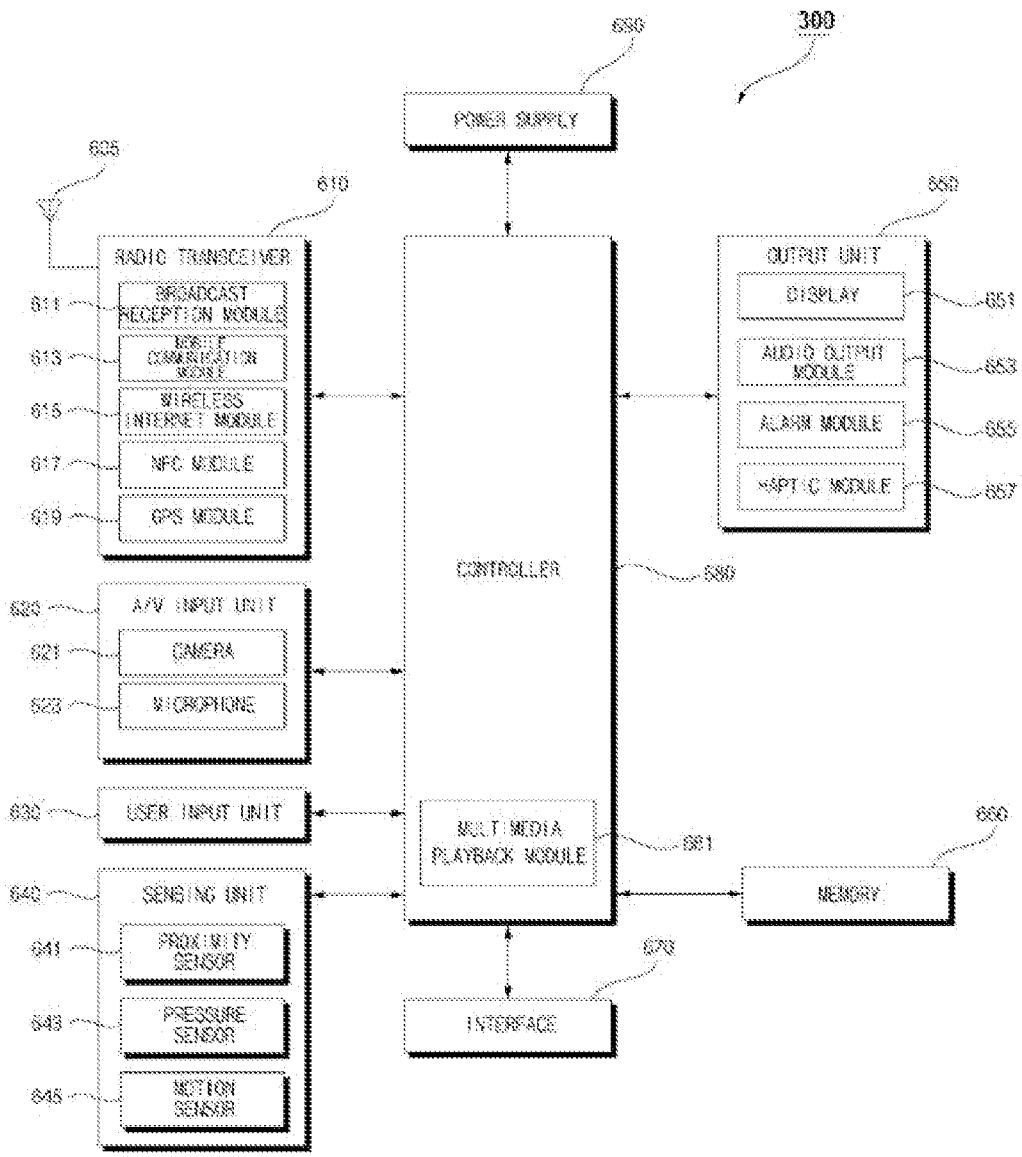
FIG. 5 is a block diagram showing the internal configuration of a mobile terminal of FIG. 1.

FIG. 5 is a block diagram showing the internal configuration of a mobile terminal of FIG. 1.

Referring to FIG. 5, the mobile terminal 300 may include a radio transceiver 610, an audio/video (A/V) input unit 620, a user input unit 630, a sensing unit 640, an output unit 650, a memory 660, an interface 670, a controller 680 and a power supply 690.

The radio transceiver 610 according to the embodiment of the present disclosure may exchange data with a power management unit 500 via a network router 550. For example, if the mobile terminal 300 is a power monitoring mode for an internal power grid, the radio transceiver 610 may transmit a power monitoring request and thus receive monitoring information. As another example, if the mobile terminal 300 is in a remote control mode for an internal power grid, the radio transceiver 610 may transmit a remote control signal and receive remote control result information.

The radio transceiver 610 may include a broadcast reception module 611, a mobile communication module 613, a wireless Internet module 615, a near field communication (NFC) module 617, a global positioning system (GPS) module 619, etc.

The broadcast reception module 611 may receive at least one of a broadcast signal and broadcast-related information from an external broadcast management server through a broadcast channel. The broadcast channel may include a satellite channel and a terrestrial channel. The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 300. For example, the wireless Internet module 615 may perform Wi-Fi based wireless communication or Wi-Fi Direct based wireless communication.

The NFC module 617 may perform NFC. The NFC module 617 may receive data from the home appliance or transmit data to the home appliance, if an NFC tag or an NFC module is brought within a predetermined distance of the home appliance, that is, upon tagging.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 620 receives an audio signal or a video signal and may include a camera 621 and a microphone 623.

The user input unit 630 generates key input data enabling the user to control the operation of the mobile terminal. The user input unit 630 may include a keypad, a dome switch, a touchpad (static pressure/static electrical), etc. In particular, if the touchpad and the display 351 have a layered structure, this may be called a touchscreen.

The sensing unit 640 detects a current state of the mobile terminal 300 such as whether the mobile terminal 300 is opened or closed, the position of the mobile terminal 300 and contact/non-contact of a user and generates a sensing signal for controlling the operation of the mobile terminal 300.

The sensing unit 640 may include a proximity sensor 641, a pressure sensor 643 and a motion sensor 645. The motion sensor 645 may sense motion or position of the mobile terminal 300 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657. The display 651 displays information processed by the mobile terminal 300.

As described above, if the display 651 and the touchpad have the layered structure to configure the touchscreen, the display 651 can be used not only as an output device but also as an input device for inputting information via user touch.

The audio output module 653 may output audio data received from the radio transceiver 610 or stored in the memory 660. The audio output module 653 may include a speaker, a buzzer, etc.

The alarm unit 655 outputs a signal notifying the user that an event has occurred in the mobile terminal 600. For example, the alarm unit 655 may output a signal in the form of vibrations.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, still images, and moving images).

The interface 670 serves as an interface with all external devices connected to the mobile terminal 300. The interface 670 may receive data from an external device or receive power and transmit power to the components of the mobile terminal 300 or transmit data of the mobile terminal 300 to an external device.

The controller 680 controls the overall operation of the mobile terminal 300. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form separately from the controller 680.

The power supply 690 receives external power or internal power and supplies power required for operation to each component under control of the controller 680.

The block diagram of the mobile terminal 300 shown in FIG. 5 is only exemplary. Depending upon the specifications of the mobile terminal 300 in actual implementation, the components of the mobile terminal 300 may be combined or omitted or new components may be added. That is, two or more components may be incorporated into one component or one component may be configured as separate components, as needed. In addition, the function of each block is described for the purpose of describing the embodiment of the present disclosure and thus specific operations or devices should not be construed as limiting the scope and spirit of the present disclosure.

The home appliance system of FIG. 1 may perform the following various functions. Hereinafter, the various functions will be described with reference to FIGS. 6 to 18.

1.1. Member Registration/Management/Withdrawal 1.1.1. Member Registration

The server 500 may perform member registration, member management, member withdrawal, etc. The server 500 may perform member registration using two methods. For example, member registration may be performed via a website or an application.

The method using the website may be performed via a website based user interface (UI) provided by a membership server. The method using the application provides an open application programming interface (API).

The server 500 may register two classes, that is, a standard member and a smart member, upon member registration. The standard member performs member registration via a website or application and uses only a function provided by the website and application, without performing product registration. The smart member should perform member registration and product registration in order to use an overall service of the server 500.

Upon member registration, information for identifying a user, such as email, user id, password, country code, etc. needs to be input. The server 500 may store mail, user id, password, country code, etc. of each user. In the rule for the email or user id of the server 500, the email may be restricted to 60 digits including "@" and the password may be restricted to 6 to 12 digits. The server 500 may use an email authentication method, for member authentication. Other authentication methods, such as authentication of the mobile terminal 300, are applicable.

1.1.2. Member Management

The server 500 may provide functions such as member information change/password change via both the website and the application. The server 500 may allow registration using one email account in one country. This is referred to as single ID policy. The server may disallow overlapping registration in a plurality of countries. After member registration in one country is withdrawn, member re-registration may be performed in another country.

1.1.3. Member Withdrawal

The service of the server 500 is no longer used after member withdrawal. Therefore, the server deletes product information associated with user information. The user may withdraw from the server 500 via a website or an application.

1.2. Product Registration/Management 1.2.1. Product Registration

Product registration is a mapping process between the user of the home appliance 200 and the server 500. In order to use the service of the server 500 via the home appliance 200, product registration for the server 500 is required. The product registration process may be divided into a TFT model having a display and an LED model without a TFT LCD. In the TFT model, product information may be directly input via an input unit of the home appliance 200. In the LED model, product information may be input using the mobile terminal 300. The server 500 receives product information and identifies the TFT model or the LED model.

1.2.1.1. TFT Model Product Registration

For product registration, first, the home appliance 200 is powered on and a communication unit needs to be in a Wi-Fi connection state. A member ID should be registered with the server 500. The home appliance 200 calls an open API via a display screen and transmits a product registration request to the server 500. An open API calling method is performed in an extensible markup language (XML) format. For product registration, product registration request information or product information transmitted from the home appliance 200 to the server 500 may include user id, password, device type, device id, model name, etc.

The device id is a universal unique identifier (UUID) of the home appliance 200 and may be directly generated by the communication unit 222 of the home appliance 200. A UUID generation logic may be changed. The server 500 may confirm that the model name is valid using the received device id without overlapping of the device id, and store the device id in the memory 540. After the product registration request has finished, the home appliance 200 may attempt to first access the server 500.

1.2.1.2. LED Model Product Registration

If the home appliance 200 does not include a display screen, product registration may be performed using the mobile terminal 300. When the home appliance 200 is first turned on, the home appliance is not in a Wi-Fi connection state (station mode). The mobile terminal 300 is switched to the Wi-Fi connection state.

For product registration, the home appliance 200 is turned on and the communication unit 222 is particularly in the Wi-Fi connection state. The member ID needs to be registered with the server 500. In a product registration process, the mobile terminal 300 requests product information from the home appliance 200.

The mobile terminal 300 calls the open API and transmits the product information received from the home appliance 200 to the server. In particular, a product registration request is transmitted to the server 500. For product registration, the product registration request information or product information transmitted from the home appliance 200 to the server 500 may include user id, password, device type, device id, model name, etc.

The server 500 may confirm that the model name is valid using the received device id without overlapping of the device id, and store the device id in the memory 540. After the product registration request has finished, the home appliance 200 may attempt to first access the server 500.

1.2.2. Device Management

The server 500 may perform product registration if a member registration country and a release country of the home appliance 200 are the same. The server 500 may initialize registration information of the home appliance 200 of an existing user if a registration request for the home appliance 200 is received with respect to an already registered home appliance 200, and register the home appliance 200 as a new account.

1.3. User Authentication

The user terminal 300 may perform user authentication in order to use the home appliance 200. First, in the user authentication process performed in the mobile terminal 300, the mobile terminal 300 may call the open API and request login from the server 500.

The server 500 may authenticate login information, create a session if authentication is successful, and transmit a response including a response code, a session value, registered appliance information, a server 500 address, etc. to the mobile terminal 300. The session value may be created by the server 500 upon first login. Thereafter, the mobile terminal 300 may perform authentication using the session value.

The mobile terminal 300 may be connected via TCP connection using the received server 500 address and a port. The mobile terminal 300 may control the home appliance 200 using the information received from the server 500. For example, monitoring, remote control, diagnosis, etc. may be performed.

Next, in the user authentication process performed in the home appliance 200, the home appliance 200 may call the open API and request login from the server 500. The server 500 may transmit a response including the result value of the authentication process to the home appliance 200.

For authentication of the home appliance 200, the home appliance 200 may be connected to the server 500 over a network. The server 500 may determine whether product registration is performed using the product information received from the home appliance 200 and transmit a response including the result value of the authentication process.

1.4. Server Access and Session Maintenance 1.4.1. Access of Home Appliance 200 to Server 500

1.4.1.1. Server Access

Since the home appliance 200 uses a private IP network, the server 500 or the mobile terminal 300 may not be easily connected to the home appliance 200. In order to solve this problem, the server 500 may provide a stable connection function with the home appliance 200. A server agent may be installed in the home appliance 200.

If the home appliance 200 is booted, the server 500 is accessed over a network using a server address (URI) of the server agent. The server agent of the home appliance 200 may receive and process a terminal management command in real time.

1.4.1.2. Session Maintenance

Network connection between the home appliance 200 using a private IP network and the server 500 is maintained. Network connection between the home appliance 200 and the server is maintained via a KeepAlive/ACK message. A current session timeout time of the server 500 is set to 70 seconds. In order to maintain a connection state, the home appliance 200 should request KeepAlive/ACK every 60 seconds.

1.4.2. Access of Mobile Terminal 300 to Server 500

In order to continuously use the service of the server 500 via the mobile terminal 300, connection and session maintenance with the server 500 may be required. A connection and session maintenance method between the mobile terminal 300 and the server 500 includes an OpenAPI method and a TCP connection method.

A session timeout time of the server 500 may be set to a first time and may be changed. If logout is performed in the mobile terminal 300, the two connection methods (the OpenAPI method and the TCP connection method) are stopped and the session in the server is removed.

1.5. Multi-Session/Multi-User 1.5.1. Multi-Session of Server 500

The server 500 enables multi-session. In order to use services of several servers 500 in one home appliance 200, the server 500 may generate multiple sessions using a single ID or multiple IDs.

1.5.2. Multi-User of Server 500

The server 500 may enable multiple users to use one home appliance 200. If product registration is performed, the home appliance 200 is initialized and master rights are assigned to a user who performs product registration.

A master user may manage the user of the home appliance 200, product registration of which has been performed, perform user inquiry/deletion/registration, and transfer master rights. A slave user may request that the master user transfer rights but may not manage the user of the home appliance 200.

If a specific mobile terminal 300 has rights to control the home appliance 200, another mobile terminal 300 does not have rights to control the home appliance 200 regardless of multi-user or multi-session. If the master user performs member withdrawal, all the registered slave users for the home appliance 200 should be deleted.

1.6. Remote Control Rights

In order to use a remote control function of the home appliance 200 in the mobile terminal 300, control rights are required. Only the master user who has first requested a control command from the server 500 has control rights. Server services such as diagnosis or monitoring except for remote control may be provided to all users regardless of control rights.

A message "no rights" may be transmitted to a user who wishes to obtain control rights after initial connection. If a user who has first requested a control command from the server 500 logs out of the server, control rights are transferred to a user who has first requested a control command among the connected users.

1.7. Server Agent

In order to use the service of the server 500 in real time, the server agent installed in the home appliance 200 performs connection/session maintenance with the server 500. The server agent may process a service command of the server 500.

The server agent is turned on after power-on of the home appliance 200, product registration and Wi-Fi connection to perform session connection with the server 500. Thereafter, if Wi-Fi is disconnected or the home appliance 200 is powered off, the server agent is turned off. If the home appliance 200 is powered on and Wi-Fi connection is performed again, session connection with the server 500 may be automatically performed.

1.8. Admin Portal Site

An admin portal site may be used to confirm member information and registration of the home appliance 200. The admin portal site may be used to inquire about a variety of statistical information such as use history statistics. The admin portal site may be used for site management, menu right management, notice material management, code management, right management of each user or home appliance management for confirming information about or history of home appliances 200. The admin portal site may be used for firmware/SW management, schedule management, push management (push message management, push messaging history query), file download management, etc.

1.9. Function Implementation 1.9.1. Control

A control service refers to a service for enabling the mobile terminal 300 to remotely control the home appliance 200. Only a mobile terminal 300 (master), which has first requested a control command from the server 500, may use the control service. If a user who has first requested a control command from the server 500 logs out of the server, control rights are transferred to a user who has first requested a control command among the connected users.

A control procedure requested by the mobile terminal 300 will now be described. First, an authentication request is transmitted from the mobile terminal 300 to the server 500, a terminal connection state inquiry request is transmitted from the mobile terminal 300 to the server 500, a control command for a home appliance 200 to be controlled is transmitted from the mobile terminal 300 to the server 500, and the control command is transmitted from the server 500 to the home appliance 200. The home appliance 200 performs the control command and transmits a control result value to the server 500 and the server 500 transmits the received control result value to the mobile terminal 300.

1.9.2. Monitoring

A monitoring service is provided to monitor a current state of the home appliance 200. The monitoring service may be provided to all users requesting the monitoring service regardless of control rights. The monitoring procedure requested by the mobile terminal 300 will now be described.

The mobile terminal 300 may transmit an authentication request to the server 500. The mobile terminal 300 may transmit a terminal connection state inquiry request to the server 500. The mobile terminal 300 may transmit information about a home appliance to be monitored to the server 500.

The server 500 transmits a requested monitoring command to the home appliance. The home appliance 200 extracts monitoring data and transmits the extracted data to the server 500. The server 500 transmits the received monitoring data to the mobile terminal 300.

For example, monitoring data is transmitted only once upon monitoring request if a home appliance to be monitored is a refrigerator 200a and may be transmitted several times if the home appliance to be monitored is not the refrigerator 200a.

1.9.3. Content Download 1.9.3.1. Recipe Download

The refrigerator 200a which is the home appliance 200 may store some recipe information. However, if a new recipe is developed or a previously provided recipe contains errors, the recipe information needs to be updated.

The server 500 or the refrigerator 200a which is the home appliance 200 may request recipe information distribution. The refrigerator 200a may check recipe update and transmit a recipe information distribution request. In particular, the refrigerator 200a may request update information via a display unit 230.

The refrigerator 200a receives the update information from the server 500 and displays the update information. If update is necessary, the home appliance 200 may download a recipe information file from the server 500.

The server 500 may transmit a guide message (update guide message) to the home appliance 200. The home appliance 200, which has received the message, may download the recipe information file from the server 500.

1.9.3.2. Washing Course Download

A washing machine 200b may store some information about basic washing courses. However, if a new washing course method is developed, the information about the washing courses needs to be updated.

The mobile terminal 300, the washing machine 200b or the server 500 may request washing course information distribution.

The washing machine 200b transmits an update list inquiry request for washing course information to the server 500, receives an update list from the server 500 and displays the update list.

The washing machine 200b may select an update item according to user input and download a washing course information file for the update item.

The mobile terminal 300 transmits an update list inquiry request for washing course information to the server 500 via the Open API. The server 500 inquires about a course list installed in the washing machine 200b. The mobile terminal 300 receives an update list from the server 500 via the Open API. At this time, the course list installed in the washing machine 200b and the total course list registered with the server 500 may be transmitted together.

The mobile terminal 300 may display the update list received from the server 500. At this time, the mobile terminal 300 may distinguishably display the list installed in the washing machine 200b.

The mobile terminal 300 transmits an update item to the server 500 via the Open API according to user input. The server 500 transmits update notification to the washing machine 200b. The washing machine 200b downloads washing course information content selected by a user from the server 500.

The server 500 may transmit a guide message, for example, an update guide message, to the washing machine 200b. The washing machine 200b displays the message and transmits an update list inquiry request for washing course information to the server 500 according to user input. The washing machine 200b receives an update list from the server 500 and displays the update list. The washing machine 200b may select an update item and download a washing course information file for the update item according to user input.

1.9.4. Firmware Update

The server 500 may transmit an update package generated for firmware update to the home appliance 200. The server 500 receives and stores the update package from a manufacturer. The server 500 transmits a notification message to the home appliance 200 in order to perform update using the registered update package. The home appliance 200 downloads and installs the update package and then reboots. A firmware update result is transmitted to the server 500.

1.9.5. Smart Diagnosis (Wi-Fi Diagnosis)

A smart diagnosis service refers to a service for diagnosing the state of the home appliance 200 and displaying a diagnosis result to a user. The diagnosis service may be used by all requesting users.

First, a diagnosis procedure using a mobile terminal will be described. The mobile terminal 300 issues an authentication request to the server 500. The mobile terminal 300 transmits a terminal connection state inquiry request to the server 500. The mobile terminal 300 selects a home appliance 200 to be diagnosed via the server 500.

The server 500 transmits a diagnosis command for the selected home appliance 200 to the home appliance 200. The home appliance 200 extracts diagnosis data and transmits the extracted diagnosis data to the server 500. The server 500 transmits the diagnosis data to the mobile terminal 300.

A diagnosis procedure requested by the home appliance 200 will be described. According to user input, the home appliance 200 transmits a Wi-Fi diagnosis request via a user interface (UI) of a display. The home appliance 200 transmits a diagnosis data value to the server 500. The server 500, which has received the diagnosis data value, stores diagnosis data. The server 500 may transmit the diagnosis data to a call center server without processing the diagnosis data.

1.9.6. ZigBee FW Upgrade

The server 500 may provide firmware of a ZigBee modem for performing communication with respect to a smart grid. ZigBee modem FW update may be performed in two steps from the viewpoint of the user.

The user may call an electric power company to check whether a smart meter or an energy management system (EMS) used in a user's home may perform communication, before purchasing the home appliance 200. The user may call the electric power company to check the version of the smart meter or the EMS used in the user's home, before utilizing the ZigBee modem. The user may check whether the version displayed on the setting screen of the home appliance 200 is equal to the version of the smart meter or the EMS checked via the electric power company. If these versions are different, the user may execute ZigBee FW update according to predetermined input.

Then, the home appliance 200 may access the server 500 based on user input and receive a ZigBee FW list from the server 500. The home appliance 200 displays the received list and downloads selected ZigBee FW according to user input. At this time, the ZigBee FW may be downloaded via Wi-Fi communication. The home appliance 200 may update the received ZigBee FW. After update, the home appliance may be reset to access the smart meter.

1.9.7. Push Service

The home appliance 200 may use a push service for transmitting a message from the server 500 to the home appliance 200 in order to transmit a real-time event or a completion state. If a push function is activated in the mobile terminal 300, the home appliance 200 may transmit a state message of various functions (a course progress state of the washing machine 200b, a refrigeration/freezing setting state of the refrigerator 200a, a course progress state of a cooker 200d, etc.) to the mobile terminal 300. In the push service procedure, if the home appliance 200 registers the push message with the server 500, the server 500 transmits the push message to a push center and the push center transmits the message to the mobile terminal 300.

Examples of the push message of the refrigerator 200a may include special freezing setting notification, special freezing release notification, special freezing completion notification, etc.

Examples of the push message of the washing machine 200b may include error notification of the washing machine 200b, washing completion notification, etc.

Examples of the push message of the cooker 200d may include cooking completion notification, cleaning time notification of the cooker 200d, cooking course notification, warming-up notification of the cooker 200d, water supplementation notification for steaming, etc.

1.9.8. Specialization Function of Home Appliance 200

1.9.8.1. Food Management (Refrigerator 200a)

A food list and a shopping list of the refrigerator 200a may be sent to the mobile terminal 300 via the server 500. The refrigerator 200a requests the food list from the server 500. The refrigerator 200a receives the food list from the server 500 and displays the food list. The food list and the shopping list may be updated according to user input. The refrigerator 200a may transmit the updated food list and shopping list to the server 500.

Alternatively, the food list and the shopping list may be updated using the mobile terminal. The mobile terminal 300 logs in to the server 500 using an ID and a password. The mobile terminal 300 requests the food list from the server 500 via the Open API. The mobile terminal 300 receives the food list from the server 500 via the Open API and displays the food list. The mobile terminal 300 may update the food list and the shopping list according to user input. The mobile terminal 300 may transmit the updated food list and shopping list to the server 500 via the Open API.

1.9.8.2. Photo Transmission (Refrigerator 200a)

The mobile terminal 300 may transmit photo data of the user to the refrigerator 200a which is the home appliance 200. The mobile terminal 300 may transmit photo data selected from the gallery to the server 500 and the server 500 may transmit the received photo data to the home appliance 200. The home appliance 200 may receive the selected photo data from the server 500.

1.10. Data Management

1.10.1. Membership

When member registration is performed with respect to the server 500, the server 500 may store member information in a database (DB) 540. In the member information, a password, an email, a telephone number, a mobile phone number, etc., all of which are personal information, may be encrypted and stored. When the user withdraws from the server, the server 500 may delete the personal information and store an ID, a registration date, a withdrawal date, etc. to prevent overlapping registration.

1.10.2. Home Appliance

When the user performs product registration, for mapping between the user and the home appliance 200, the server 500 may store and manage product information. The product information may include a UUID of the home appliance 200, a model name, a user ID, a product registration date, etc. If the user deletes the product information, the information about the home appliance 200 is not deleted and the user ID value mapped to the home appliance 200 may be set to null.

1.10.3. Service History

The server 500 may store a service history of the user. The stored service history may be used as data for providing a better service. If the user deletes the product information, the user history of the home appliance 200 may be deleted after being backed up to the server 500.

1.10.4. Smart Diagnosis

The user may use a diagnosis data history stored in the server 500 in order to view the diagnosis state of the home appliance 200. Accordingly, the server 500 may store and manage diagnosis data in the server 500 when executing a diagnosis service of the home appliance 200. When the user deletes product information, the diagnosis history of the home appliance 200 may be deleted after being backed up to the server 500.

1.10.5. Used Energy Amount Notification

In order to use the amount of power used by the home appliance 200 in the mobile terminal 300, the home appliance 200 periodically transmits power information to the server 500 and the server 500 stores the power information. In particular, the server 500 may store the power data in minutes/hours/days. The method for managing the home appliance may include a method for managing the home appliance by accessing a portable server 500d via a terminal 301 and a method for managing the home appliance using the mobile terminal 300.

Figure 6:
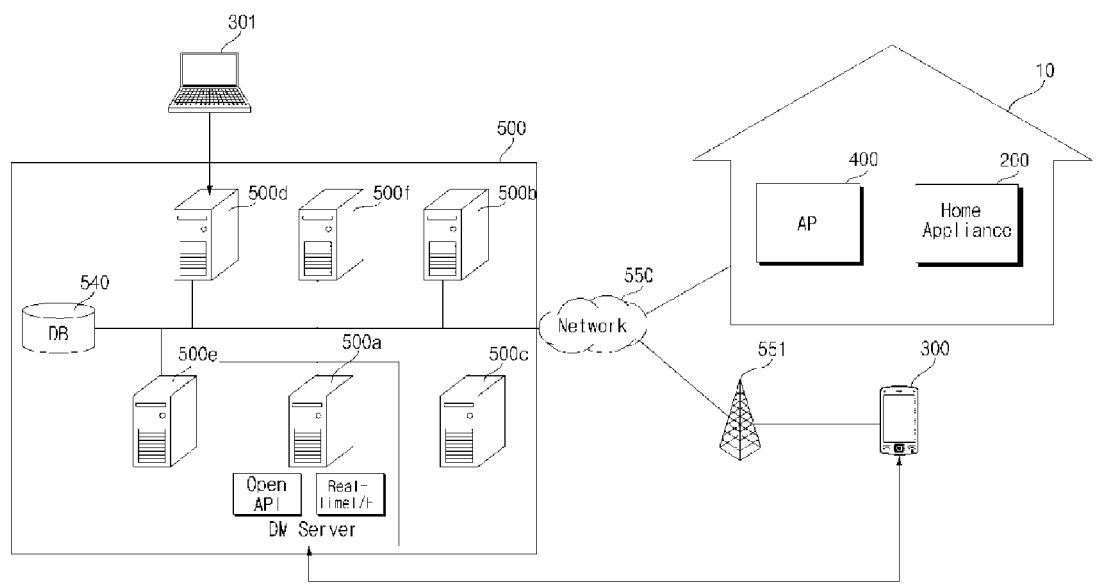
FIG. 6 is a diagram showing an example of a home appliance system according to an embodiment of the present disclosure.

FIG. 6 is a diagram showing an example of a home appliance system according to an embodiment of the present disclosure. Referring to FIG. 6, the home appliance system may include the server 500, the terminal 301, the mobile terminal 300, the home appliance 200 and an AP apparatus 400.

The server 500 may include a plurality of internal servers. In the figure, the server 500 includes a DM server 500a, a DL server 500b, a notify server 500c, a portal server 500d, a report server 500e and a legacy server 500f. The DM server 500a may include an Open API and a real-time interface and perform Open API based communication and real-time interface based communication.

When accessing the server 500 via the terminal 301, the DM server 500a and a DM client interwork using a centralized management method and a plurality of home appliance 200 may be batch-processed via one registration operation. Statistical management may be performed via work management. When accessing the server 500 via the mobile terminal 300, the user may remotely manage the home appliance 200 thereof and interwork with the DM client or an SA agent installed in the home appliance 200 via an Open API/real-time interface of the DM server 500a.

The real-time interface method has higher speed than that of the Open API method but transmission of file data to the home appliance 200 may be difficult. The mobile terminal 300 may access the server 500 using the AP apparatus 400, a network 550, a mobile network 551, etc. The mobile terminal 300 may remotely manage the home appliance 200 using the Open API or the real-time interface provided by the DM server 500a.

The interworking method between the mobile terminal 300 and the server 500 may be divided into an Open API communication method and a real-time interface based communication method. The Open API communication method may be used upon authentication processing or when the file data stored in the server 500 is transmitted to the home appliance 200. The real-time interface based communication method may be used for real-time processing such as control command delivery and result reception or monitoring.

Figure 7:
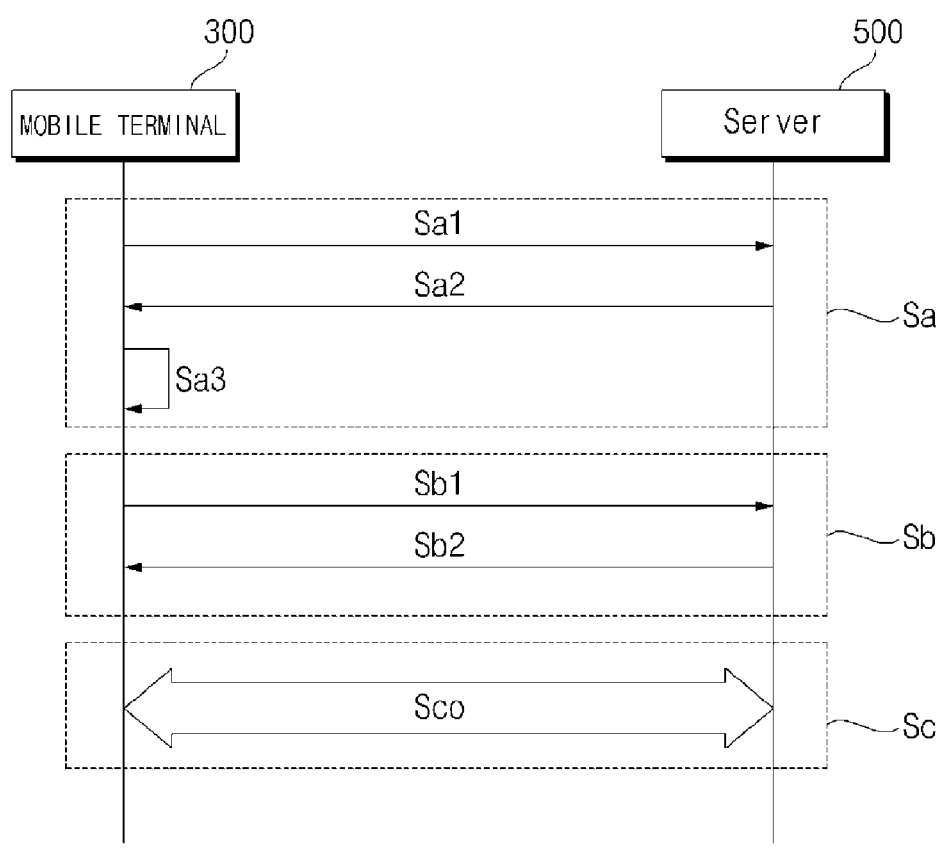
FIG. 7 is a diagram showing an interworking procedure between a mobile terminal and a DM server.

FIG. 7 is a diagram showing an interworking procedure between the mobile terminal 300 and the DM server 550a. Sa denotes an authentication process, Sb denotes a management process via an Open API, and Sc denotes a management process via a real-time service.

In the authentication process Sa, the mobile terminal 300 transmits authentication information to the server 500 via the Open API (Sa1). The server 500 transmits authentication approval and TCP port information in response thereto (Sa2). The mobile terminal 300 determines whether to access the server 50 via the Open API or the real-time interface (Sa3).

The management process Sb via an Open API may include step Sb1 of transmitting a work request via the Open API from the mobile terminal 300 to the server 500 and step Sb2 of transmitting a work result from the server 500 to the mobile terminal 300 in response thereto. The management process Sc via the real-time service may include a work request and result reception step Sco via a TCP channel.

The server 500 may perform multi-session processing and session maintenance time synchronization. The server 500 processes sessions between the mobile terminal 300 and the home appliance 200 if multiple sessions are present. The server 500 may perform session maintenance time synchronization between the Open API and the real-time interface (RTI).

For example, after the mobile terminal 300 logs in to the server 500 using the Open API, session maintenance time processing according to the RTI communication method with the mobile terminal 300 may be performed according to a session maintenance period.

The server 500 may perform device multi-session processing. The server 500 may perform authentication of the mobile terminal 300 via the Open API and perform registration via the RTI. The server 500 may manage device multi-session via authentication and registration of the mobile terminal 300. The mobile terminal 300 requests user authentication from the server 500 using a user ID and a password via the Open API. The server 500 transmits a device ID list and an RTI URL manageable by the user ID to the mobile terminal 300.

The mobile terminal 300 starts management of the home appliance 200 via the Open API using the device ID list and the RIT URL.

Multi-user authentication may be processed via the Open API 505a and multi-user management using a single ID via the Open API is possible.

When the server 500 manages the home appliance 200 via the Open API 505a, if the management operation is being performed in the home appliance 200, DM session processing is impossible and thus a message indicating that the management operation is being performed may be returned via the Open API.

The server 500 may not simultaneously transmit two or more management commands of the home appliance 200 via the Open API 505a but may receive a result of one management command and then transmit another management command.

The mobile terminal 300 may perform RTI registration and home appliance 200 management session processing.

The mobile terminal 300 may transmit a device ID of the home appliance 200 to be managed and a "home appliance 200 connection state request" message to the server 500 using the URL of an RTI server in the DM server 500a.

The mobile terminal 300 is registered with the RTI 505*b* of the server 500 and the RTI 505*b* may transmit manageable state information in response to the "home appliance 200 connection state request" message.

If the number of home appliances to be managed is N, before the management command request of the home appliances 200, the device ID is included in the "home appliance 200 connection state request" message and the manageable state of the home appliance 200 is checked by the response of the RTI 505*b* of the server. At this time, multi-device management is possible by one open RTI TCP socket and re-access is not necessary.

Multi-user management using a single ID is possible via the RTI. All users may perform diagnosis, monitoring management, etc.

In the robot cleaner 200*e*, only the mobile terminal 300, which has first accessed the RTI 505*b* of the server, may access the RTI and mobile terminals which have accessed the RTI 505*b* thereafter may not access the RTI.

Control is possible by the user or the mobile terminal which has been first registered with the RTI 505*b* of the server only. In particular, a message "no rights" may be transmitted to a user or mobile terminal which wishes to have control rights after initial connection.

If a user or mobile terminal which has been first registered with the RTI 505*b* of the server logs out of the server, control rights are transferred to a user or mobile terminal which has first requested a control command among the registered users or mobile terminals.

Figure 8A:
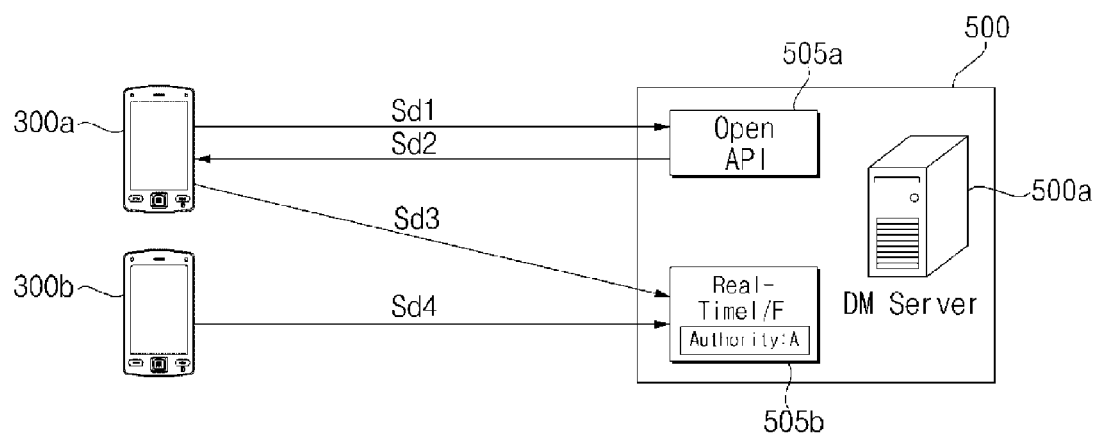
FIG. 8A is a diagram showing a procedure of acquiring control rights of a mobile terminal.

FIG. 8A is a diagram showing a procedure of acquiring control rights of a mobile terminal.

Referring to FIG. 8A, a first mobile terminal 300*a* first transmits login information to the server 500 to log in to the server (Sd1). Then, the server 500 transmits a device list and a session ID for the home appliance to the first terminal 300*a* via the Open API 505*a* (Sd2). The first mobile terminal 300*a*, which has received the device list and the session list, accesses the RTI 505*b* of the server using the session ID (Sd3). Then, the first mobile terminal 300*a* acquires control rights.

After the first mobile terminal 300*a* accesses the RTI 505*b* of the server, if a second mobile terminal 300*b* accesses the RTI 505*b* of the server (Sd4), the second mobile terminal 300*b* does not acquire control rights. Thereafter, if the first mobile terminal 300*a* has logged out from the server, the second mobile terminal 300*b* may acquire control rights.

A single user may simultaneously manage N home appliances via the RTI 505*b*. If all users who are registered with or connected to the RTI 505*b* request monitoring, the RTI 505*b* transmits one monitoring start request to the home appliance 200 and distributes monitoring data to all users or mobile terminals.

If the mobile terminal 300 logs in via the Open API and accesses the RTI 505*b*, the Open API and the RTI module preferably maintain the same session with respect to the mobile terminal 300. If the mobile terminal 300 logs in via the Open API and is registered with the RTI 505*b*, the mobile terminal has a session maintenance time corresponding to the time set in the server 500. The mobile terminal 300 preferably transmits a session maintenance request to the Open API 505*a* and the RTI 505*b* before the set time has elapsed, in order to add the session maintenance time to the set time.

Figure 8B:
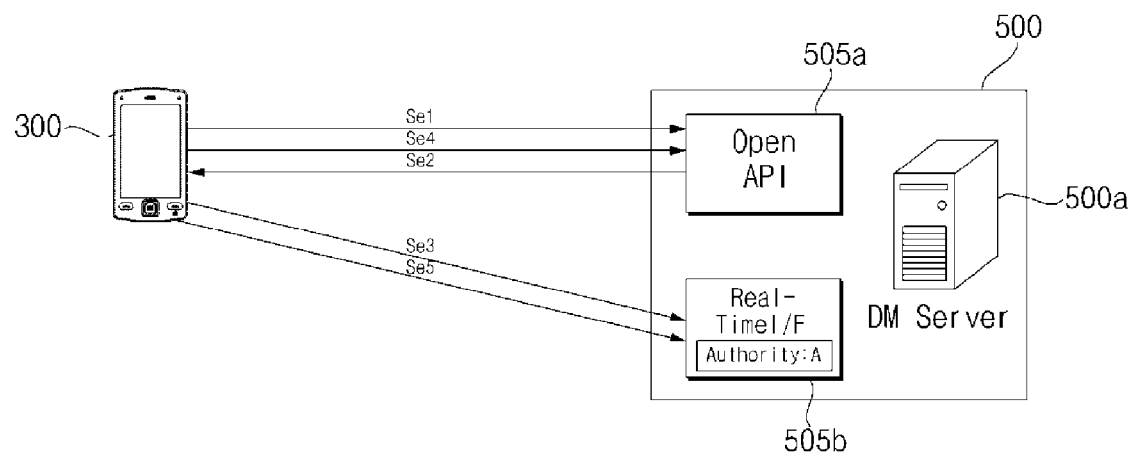
FIG. 8B is a view referred to for describing a session time maintenance procedure of a mobile terminal.

FIG. 8B is a view referred to for describing a session time maintenance procedure of a mobile terminal. If the mobile terminal 300 transmits login information to the server 500 (Se1) to perform login, the server 500 transmits a device list and a session ID for the home appliance to the mobile terminal 300 via the Open API 505*a* (Se2). The mobile terminal 300, which has received the device list and the session list, accesses the RTI 505*b* of the server using the session ID (Se3).

The mobile terminal 300 transmits a session maintenance request to the Open API 505*a* (Se4), for session duration maintenance, and the Open API 505*a* initializes the session duration. The mobile terminal 300 transmits a session maintenance request to the RTI 505*b* (Se5), for session duration maintenance, and the RTI 505*b* initializes the session duration. Thus, it is possible to maintain the session duration.

FIGS. 9A to 10C are diagrams showing various examples of data exchange between the mobile terminal 300 and the server 500, more particularly, the Open API 505*a* of the server 500.

Figure 9A:
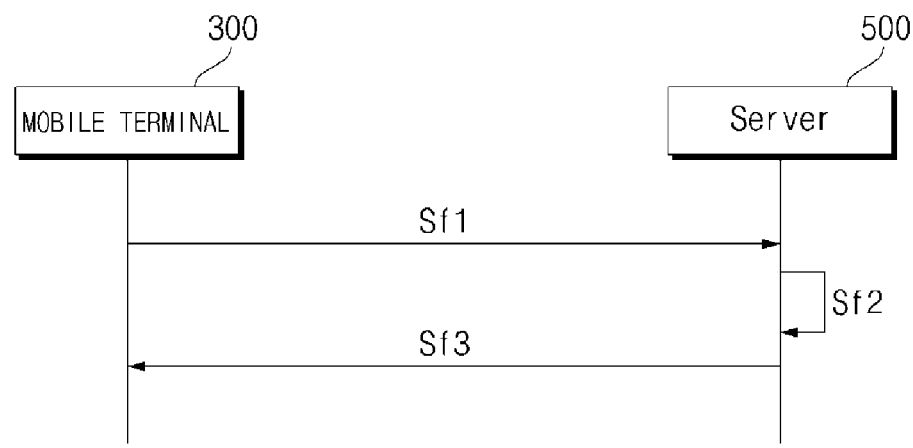
FIGS. 9A to 10C are diagrams showing various examples of data exchange between a mobile terminal and a server.

FIG. 9A shows an example of a user authentication method. The mobile terminal 300 transmits login information to the server 500, e.g., the Open API 505*a* of the server 500 (Sf1). The server 500, e.g., the Open API 505*a* of the server 500, performs authentication (Sf2) and transmits a session ID to the mobile terminal 300 (Sf3) after authentication has finished. At this time, data transmitted to the mobile terminal 300 may further include a device type. That is, for manageable home appliances only, a device list of home appliances may be further transmitted from the server 500 to the mobile terminal 300.

Figure 9B:
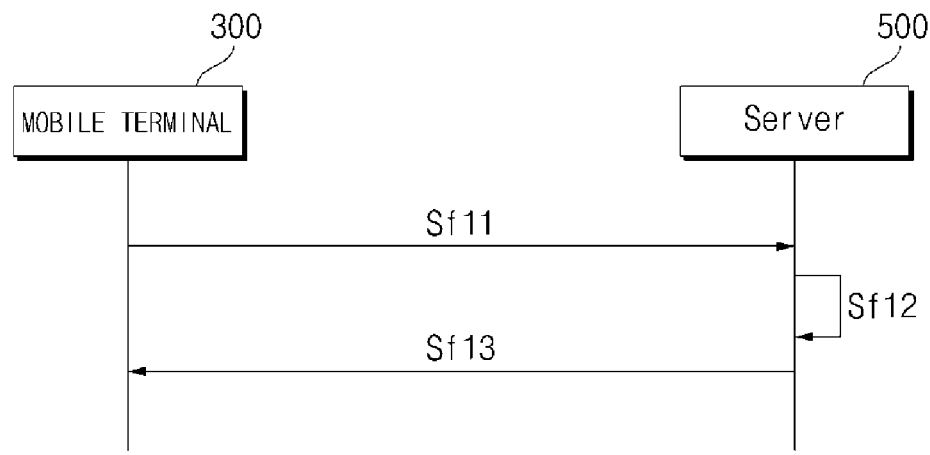

FIG. 9B shows another example of a user authentication method. The mobile terminal 300 transmits login information to the server 500, e.g., the Open API 505*a* of the server 500 (Sf11). The server 500, e.g., the Open API 505*a* of the server 500, performs authentication (Sf12) and transmits a session ID to the mobile terminal 300 (Sf13) after authentication has finished. At this time, data further transmitted to the mobile terminal 300 may not include a device type, unlike FIG. 9A. That is, a device list of all manageable home appliances corresponding to the user ID may be further transmitted from the server 500 to the mobile terminal 300.

Figure 9C:
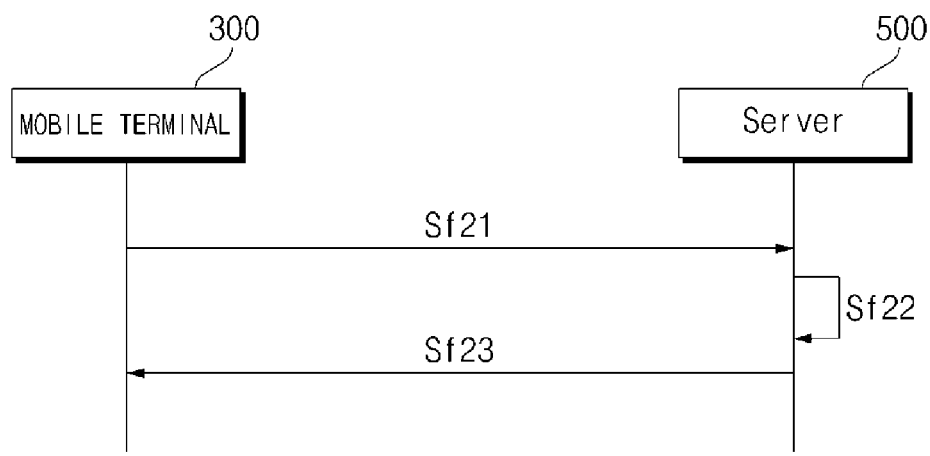

FIG. 9C shows another example of a user authentication method. The mobile terminal 300 transmits login information to the server 500, e.g., the Open API 505*a* of the server 500 (Sf21). The server 500 and, e.g., the Open API 505*a* of the server 500, perform authentication (Sf22) and transmit a session ID to the mobile terminal 300 (Sf23) after authentication has finished.

At this time, data further transmitted to the mobile terminal 300 may not include a device type, unlike FIG. 9A. That is, a device list of all manageable home appliances corresponding to the user ID may be further transmitted from the server 500 to the mobile terminal 300. If an RTI service is used, authentication may be requested via an interface. That is, separate authentication may be necessary in the RTI 505*b* of the server.

Figure 9D:
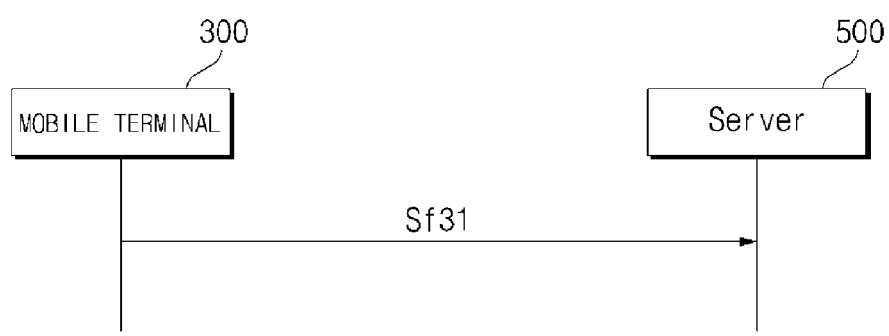

FIG. 9D shows an example of user logout. The mobile terminal 300 transmits logout information to the server 500, e.g., the Open API 505*a* of the server 500 (Sf31). Therefore, logout is performed. If logout information is not transmitted or if session maintenance is not performed, logout may be automatically performed after a predetermined time. If the RTI is connected, transmission of the logout information to the RTI may be necessary.

Figure 9E:
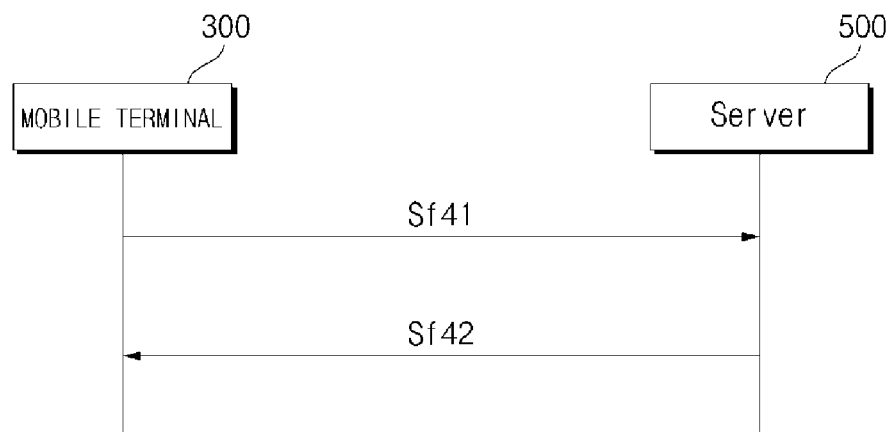

FIG. 9E shows an example of session maintenance. The mobile terminal 300 transmits session maintenance information to the server 500, e.g., the Open API 505*a* of the server 500 (Sf41). The server 500, e.g., the Open API 505*a* of the server 500, initializes a session and transmits result information thereof to the mobile terminal 300 (Sf42).

Figure 10A:
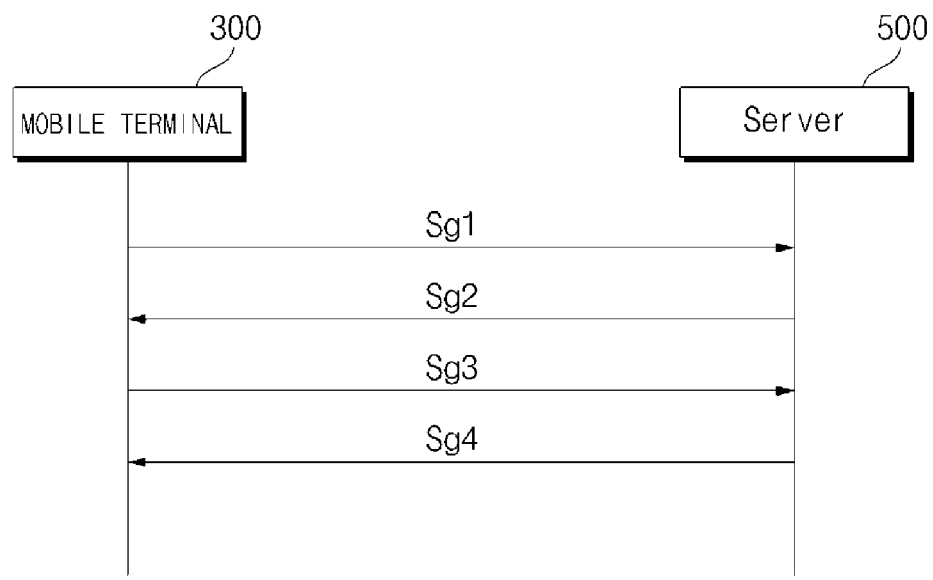

FIG. 10A shows an example of image transmission. The mobile terminal 300 transmits an image transmission request to the server 500, e.g., the Open API 505a of the server 500 (Sg1). The server 500, e.g., the Open API 505a of the server 500, transmits an image file and file name information to the mobile terminal 300 (Sg2). Then, the mobile terminal 300 may receive an image from the home appliance 200. The mobile terminal 300 may transmit an image list transmission request to the Open API 505a of the server 500 (Sg3). The Open API 505a of the server 500 transmits the result value to the mobile terminal 300 (sg4).

Figure 10B:
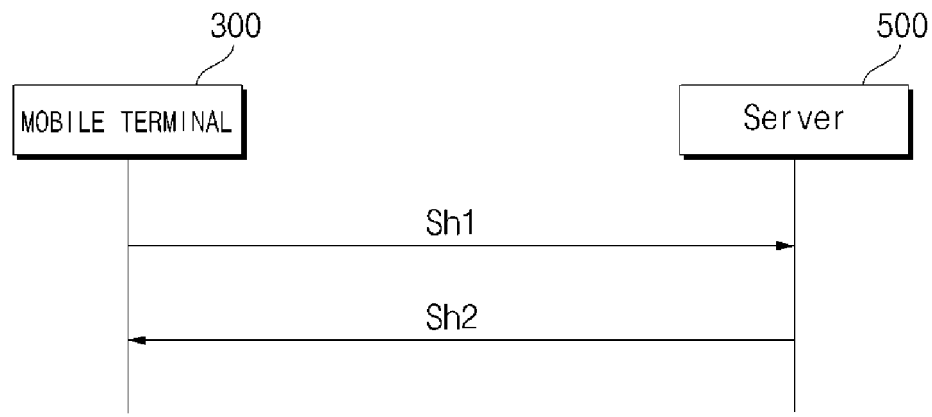

FIG. 10B shows an example of RTI connection confirmation. The mobile terminal 300 transmits an RTI connection confirmation request to the server 500, e.g., the Open API 505a of the server 500 (Sh1). The server 500, e.g., the Open API 505a of the server 500, transmits RTI connection confirmation information to the mobile terminal 300 (Sh2). Thus, it is possible to easily check whether the mobile terminal 300, more particularly, the application is connected via the RTI.

Figure 10C:
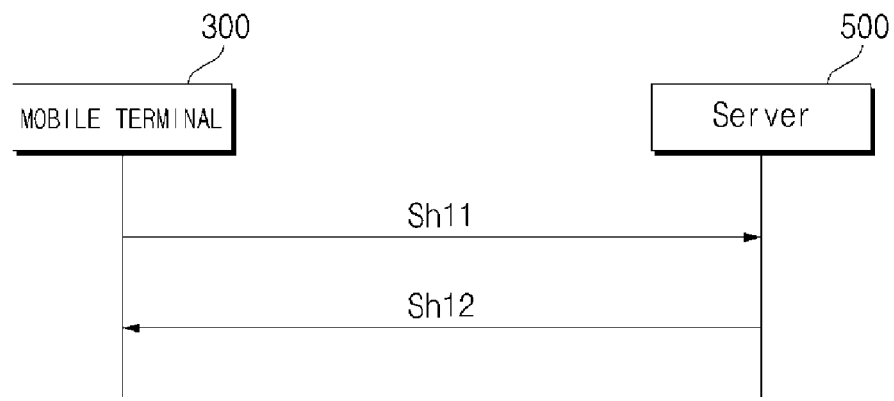
Figure 11:
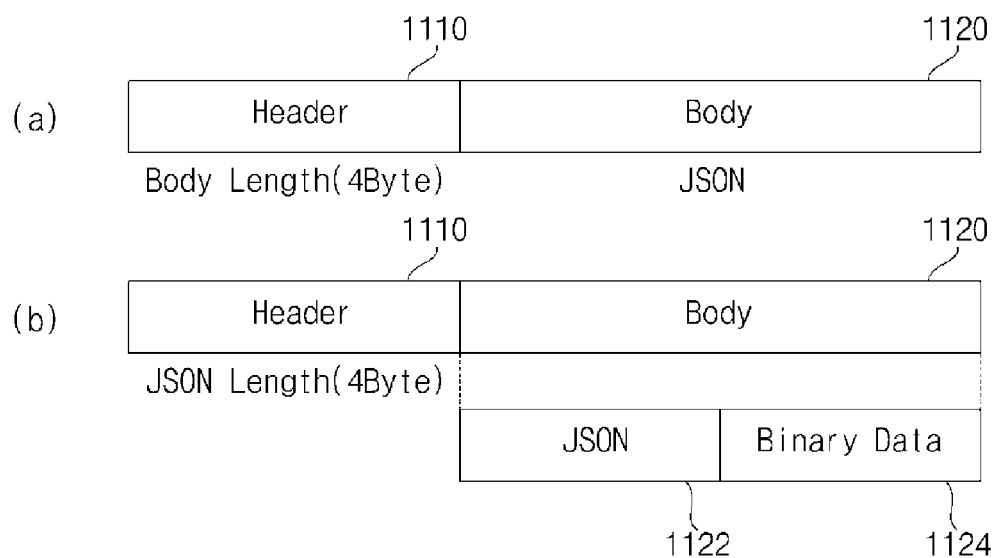
FIG. 11 is a diagram showing a packet format according to a real-time interface protocol.

FIG. 10C shows an example of location information confirmation of a home appliance. Referring to FIG. 10C, the mobile terminal 300 transmits a location information confirmation request of the home appliance to the server 500, e.g., the Open API 505a of the server 500 (Sh11). The server 500, e.g., the Open API 505a of the server 500, transmits location information of the home appliance to the mobile terminal 300 (sh12). Thus, it is possible to easily confirm the location information of the home appliance.

If real-time processing is necessary during the service of the Open API, a real-time interface protocol may be used. Such a protocol may use a JSON format having easy extensibility in a body of a transport layer. As the protocol of the mobile terminal 300 and the notify server 500c, for extensibility, a JSON protocol may be used. JSON is an abbreviation for JavaScript Object Notation, is notation of an object using JavaScript and enables light data exchange because few supplementary separators are used when data is exchanged over the Internet.

FIGS. 11(a) and 11(b) illustrate a diagram showing a packet format according to a real-time interface protocol. FIG. 11(a) shows a data format of JSON, which may include a header 1110 and a body 1120. JSON data may be included in the body 1120. FIG. 11(b) shows a data format including JSON and binary data, which may include a header 1110 and a body 1120. The body 1120 may include JSON data 1122 and binary data 1124. A body length is not the length of the body but is the length of the JSON message. The binary data may be used for a mass data service.

In message transmission, the mobile terminal 300 (transmitter) may transmit JSON data to the real-time interface (receiver) 505b of the server 500. In message reception, the real-time interface (receiver) 505b of the server 500 may transmit JSON data to the transmitter (the mobile terminal 300) in response to message transmission in the following format.

For example, a real-time interface command based on a JSON data format may be a diagnosis start command, a diagnosis command processing result, diagnosis data, monitoring start/stop command, monitoring command processing result, monitoring stop notification, state change upon monitoring, a remote control command, a remote control command processing result, etc. of the server.

For example, the mobile terminal 300 may transmit a connection state information request of the home appliance to the RTI 505b of the server 500 based on the JSON data format and receive connection state result information from the RTI 505b of the server 500 based on the JSON data format.

Similarly, the mobile terminal 300 may transmit a session maintenance request to the RTI 505b of the server 500 based on the JSON data format and receive a session maintenance request result from the server 500 based on the JSON data format. The mobile terminal 300 may transmit a home appliance diagnosis start/stop request to the RTI 505b of the server 500 based on the JSON data format and receive a result from the server 500 based on the JSON data format.

The home appliance 200 may transmit a diagnosis result to the RTI 505b of the server 500 based on the JSON data format and the RTI 505b of the server 500 may transmit a diagnosis result to the mobile terminal 300 based on the JSON data format, upon diagnosis completion.

The mobile terminal 300 may transmit a home appliance monitoring start/stop request to the RTI 505b of the server based on the JSON data format and receive a result from the server 500 based on the JSON data format. The mobile terminal 300 may transmit a remote control command to the RTI 505b of the server 500 based on the JSON data format and receive a result from the server 500 based on the JSON data format.

Figure 12:
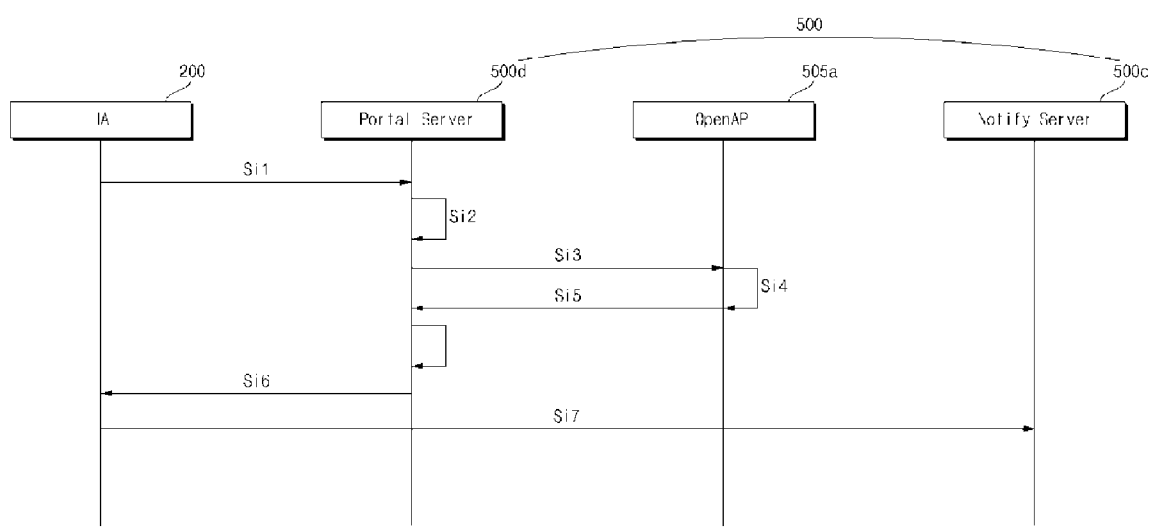
FIG. 12 is a diagram showing a signal flow for product registration in a home appliance including a display.

FIG. 12 is a diagram showing a signal flow for product registration in a home appliance including a display. A home appliance 200 transmits a product registration request to a server 500, more particularly, a portal server 500d of the server 500 based on user input via a display (Si1). At this time, product information may also be transmitted. The product information may include user id, password, device type, device id, model name, etc.

The portal server 500d stores the product information (Si2). The portal server 500d transmits the product information to an Open API 505a of the server 500 (Si3). The Open API 505a stores the product information (Si4). The Open API 505a transmits a product information storage result to the portal server 500d (Si4).

The portal server 500d transmits product registration result information to the home appliance 200 (Si5). The home appliance 200 is connected to the server 500, more particularly, a notify server 500c of the server 500 via TCP connection (Si6). Thereafter, the notify server 500c may transmit a product registration result to the mobile terminal 300.

Figure 13:
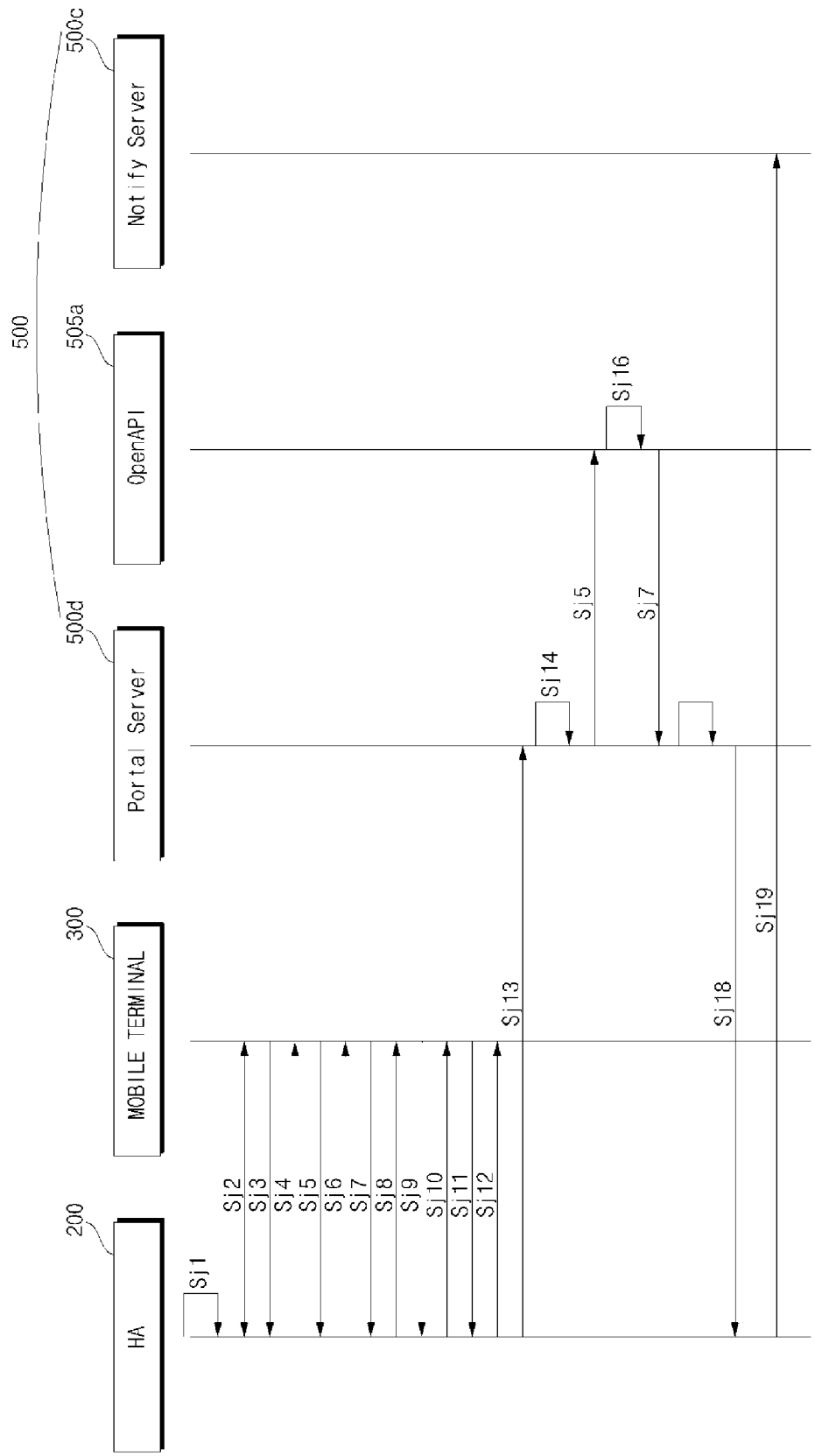
FIG. 13 is a diagram showing a signal flow for product registration in a home appliance not including a display.

FIG. 13 is a diagram showing a signal flow for product registration in a home appliance not including a display. The home appliance 200 is switched to a soft AP mode by specific key input (Sj1). According to the soft AP mode of the home appliance 200, the mobile terminal 300 is connected to the home appliance 200 via TCP connection (Sj2).

The mobile terminal 300 requests initialization after TCP connection with the home appliance 200 (Sj3). The home appliance 200 responds to the request (Sj4), the mobile terminal 300 requests product information (Sj5) and the home appliance 200 transmits the product information to the mobile terminal 300 in response thereto (Sj6). The mobile terminal 300 requests an AP apparatus list (Sj7) and the home appliance 200 transmits the AP apparatus list stored in the home appliance 200 to the mobile terminal 300 (Sj8).

The mobile terminal 300 transmits an AP apparatus setting request to the home appliance 200 by referring to the received AP apparatus list (Sj9). The home appliance 200 sets the AP apparatus in response to the request and transmits an AP apparatus setting response (Sj10). The mobile terminal 300 transmits a request to release the set AP apparatus (Sj11) and the home appliance 200 transmits a release response to the request (Sj12). Thereafter, the home appliance 200 performs access to the AP apparatus. The home appliance 200 ends the soft AP mode and operates in a client mode.

The home appliance 200 transmits a product registration request to the server 500, e.g., the portal server 500*d* of the server 500, after switching to the client mode (Sj12). At this time, the product information may also be transmitted. The product information may include user id, password, device type, device id, model name, etc.

The portal server 500*d* stores the product information (Sj14). The portal server 500*d* transmits the product information to the Open API 505*a* of the server 500 (Sj15). The Open API 505*a* stores the product information (Sj16). The Open API 505*a* transmits a product information storage result to the portal server 500*d* (Sj17).

The portal server 500*d* transmits product registration result information to the home appliance 200 (Sj18). The home appliance 200 is connected to the server 500, e.g., the notify server 500*c* of the server 500, via TCP connection (Sj19). Thereafter, the notify server 500*c* may transmit a product registration result to the mobile terminal 300.

FIG. 14 is a diagram showing a signal flow for remote control of a home appliance. For product remote control, the mobile terminal 300 may transmit a remote control request to the server 500, e.g., the notify server 500*c* of the server 500 (Sk1).

The notify server 500*c* checks a connection state of the home appliance (Sk2). If the home appliance is not connected, the notify server transmits, to the mobile terminal 300, a response indicating that the home appliance is not connected.

If the home appliance is connected, the notify server 500*c* transmits a TCP relay including a remote control command to the home appliance 200, e.g., an agent 270 of the home appliance 200 (Sk3). The agent 270*a* calls the API via the controller 270 of the home appliance 200 (Sk4). The controller 270 of the home appliance 200 transmits an API response result (the remote control result according to the remote control command) to the agent 270*a* (Sk5).

The home appliance 200, e.g., the agent 270*a* of the home appliance 200 transmits a TCP relay including a remote control result according to the remote control command to the server 500, e.g., the notify server 500*c* of the server 500 (Sk6). The server 500, e.g., the notify server 500*c* of the server 500, transmits a server control response to the mobile terminal 300 (Sk7). Therefore, the mobile terminal 300 may receive remote control and a result thereof.

FIG. 15 is a diagram showing a signal flow for logging in to a server. The mobile terminal 300 transmits login information including an id and a password to the server 500, e.g., the Open API 505*a* of the server 500 (Sl1). The server 500, e.g., the Open API 505*a* of the server 500, transmits the received login information to the portal server 500*d* (Sl2). The portal server 500*d* may perform login using the received login information and transmit a login result, an SSP ID, a meter ID. etc. to the Open API 505*a* of the server 500 (Sl3).

The Open API 505*a* of the server 500 searches for a registered home appliance and searches for product information, a notify server address for TCP connection and a port (S14), after login approval. The Open API 505*a* of the server 500 transmits the product information, the notify server address for TCP connection and the port to the mobile terminal 300. Therefore, the mobile terminal 300 can make a TCP connection request.

FIG. 16 is a diagram showing a signal flow for a connection state request for a home appliance. The mobile terminal 300 transmits a home appliance connection state request to the server 500, e.g., the notify server 500*c* of the server 500 (Sm1). At this time, the home appliance connection state request may be transmitted to the notify server 500*c* using the product information and the notify server address for TCP connection received in step Sl4 of FIG. 15.

The notify server 500*c* checks whether the home appliance requested by the mobile terminal has been registered or connected to the server 500 (Sm2). A result value thereof is transmitted to the mobile terminal 300 (Sm3). Therefore, it is possible to determine registration and connection of a specific home appliance to the server 500 via the server 500.

Figure 17A:
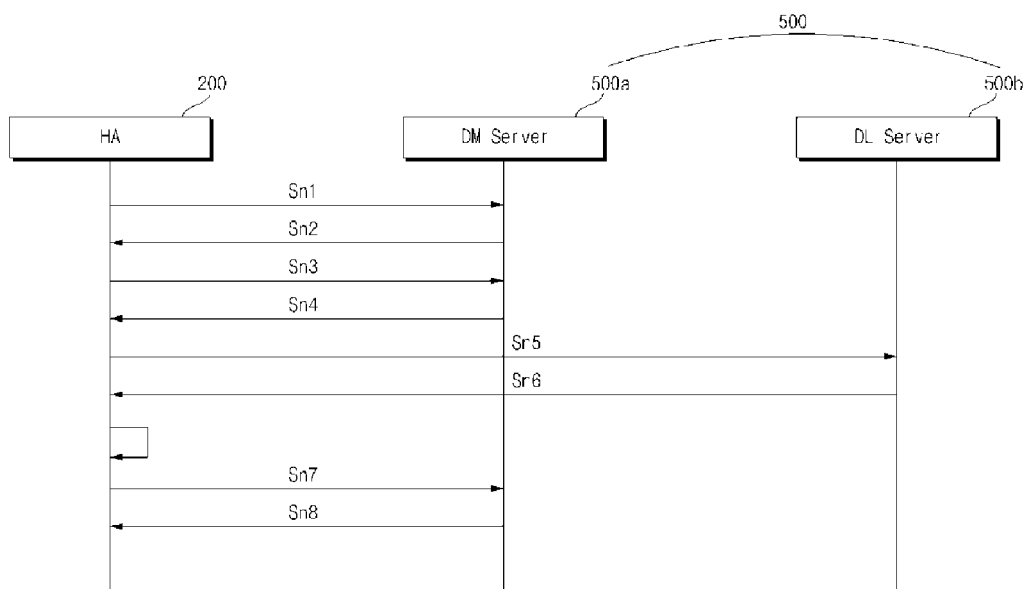
FIGS. 17A to 17B are diagrams showing a signal flow for updating firmware of a home appliance.

FIG. 17A shows the case in which an OMA DM method is used for firmware update of the home appliance. The home appliance 200 transmits a firmware version update request to the server 500, e.g., the DM server 500*a* of the server 500 (Sn1). At this time, current version information may also be transmitted. The DM server 500*a* transmits a response for update to a higher firmware version to the home appliance 200 (Sn2).

The home appliance 200 transmits an address information request for the DL server to the DM server 500*a* (Sn3), for update to a higher firmware version. The DM server 500*a* transmits address information of the DL server to the home appliance 200 (Sn4).

The home appliance 200 transmits a download request for a firmware update file to the DL server 500*b* using the address information of the DL server (Sn5). The DL server 500*b* transmits the firmware update file to the home appliance 200 (Sn6). The home appliance 200 performs firmware update using the received firmware update file.

The home appliance 200 transmits a firmware update completion report to the DM server 500*a* (Sn7), after firmware update completion. The DM server 500*a* transmits a response to the firmware update completion report to the home appliance 200 (Sn8). Therefore, the home appliance 200 may update firmware and the server 500 may confirm firmware update completion of the home appliance 200.

Figure 17B:
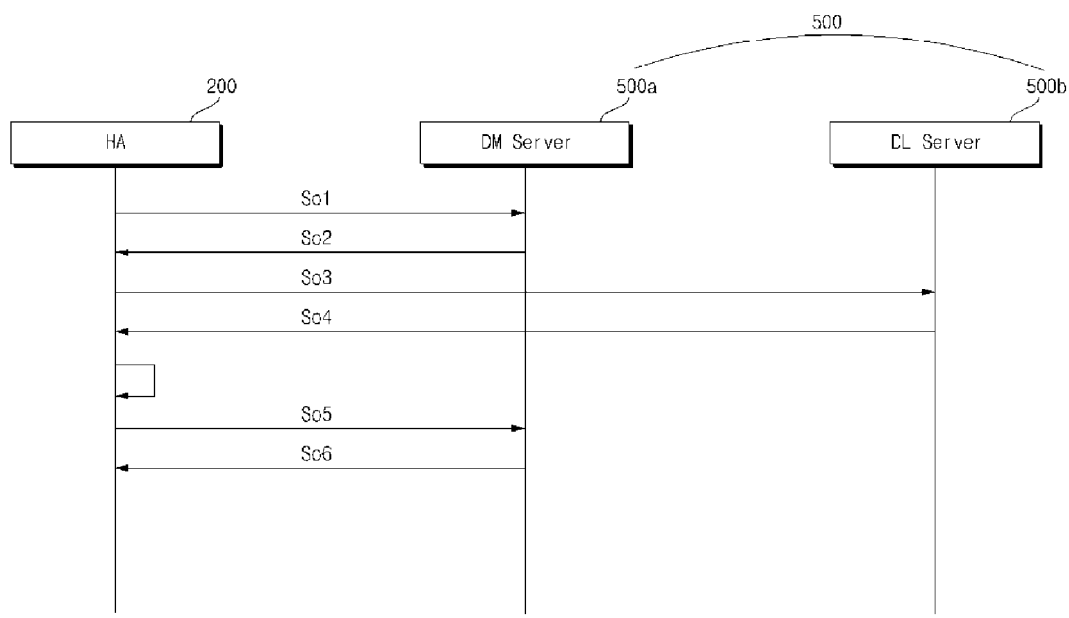

FIG. 17B shows the case in which an RTOS method is used for firmware update of a home appliance. The home appliance 200 transmits a firmware version update request to the server 500, e.g., the DM server 500*a* of the server 500 (So1). At this time, current version information may also be transmitted. The DM server 500*a* transmits a response for update to a higher firmware version to the home appliance 200 (So2).

The home appliance 200 transmits a firmware update file download request to the DL server 500*b* without a DL server address information request described with reference to FIG. 17A (So3). The DL server 500*b* transmits the firmware update file to the home appliance 200 (So4). The home appliance 200 performs firmware update using the received firmware update file.

The home appliance 200 transmits a firmware update completion report to the DM server 500*a* (So5), after firmware update completion. The DM server 500*a* transmits a response to the firmware update completion report to the home appliance 200 (So6). Therefore, the home appliance 200 may update firmware and the server 500 may confirm firmware update completion of the home appliance 200.

FIG. 17C is a diagram showing a signal flow for updating content. The mobile terminal 300 transmits a software update list request to the server 500, e.g., the Open API 505*a* of the server 500 (Sp1). The Open API 505*a* transmits a software update list response to the mobile terminal 300 in response to the request (Sp2).

The mobile terminal 300 selects specific software from the software update list based on user input and transmits a software update request to the Open API 505a (Sp3). The Open API 505a transmits a work ID to the mobile terminal 300 and transmits a notify message for update to the notify server 500c (Sp4).

The notify server 500c transmits the notify message for software update to the home appliance 200, e.g., the agent 270a of the home appliance (Sp5). The notify message is sent to the controller 270 of the home appliance 200.

The home appliance 200, e.g., the controller 270 of the home appliance 200, transmits a software download request to the server 500, e.g., the Open API 505a of the server 500 (Sp6). The Open API 505a of the server 500 transmits URL information for software download to the home appliance 200 (Sp7). The home appliance 200 is connected to the server 500 in DL using the URL information and transmits a download request (Sp8).

The server 500 transmits a software file to the home appliance 200 (Sp9). The home appliance 200 downloads a software file. After download completion, the controller 270 of the home appliance 200 finishes DL connection (Sp10). The controller 270 of the home appliance 200 transmits a software download result to the server 500 (Sp11) and the server 500, e.g., the Open API 505a of the server 500 transmits a result to the home appliance as a response (Sp12).

The mobile terminal 300 may inquire of the server 500, e.g., the Open API 505a of the server 500 about a software download result (Sp13) and the Open API 505a may transmit the result to the mobile terminal 300 (Sp14). Therefore, it is possible to perform software download of the home appliance 200 and check the result thereof using the mobile terminal 300.

Figure 17D:
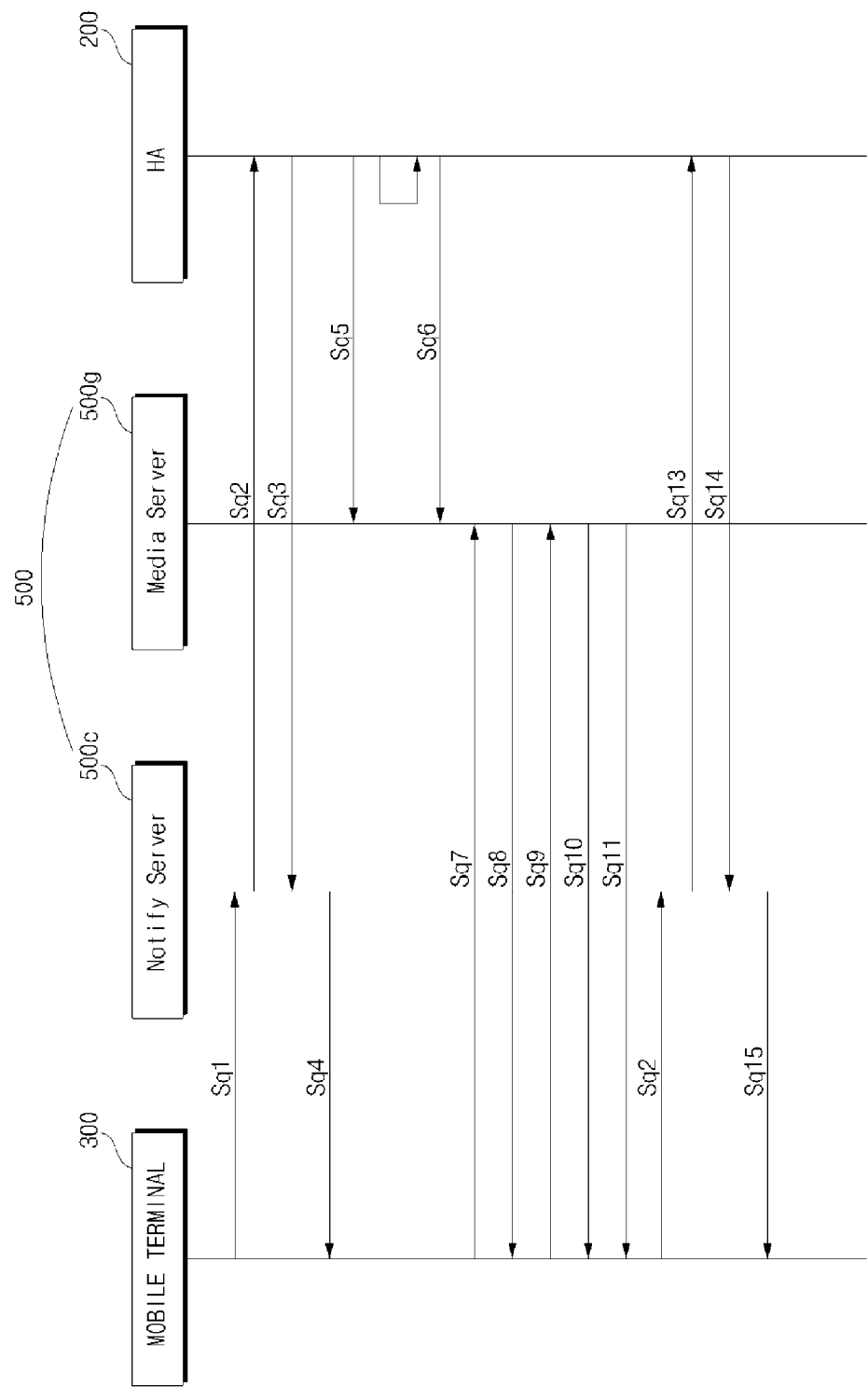
FIG. 17D is a diagram showing a signal flow for providing video data.

FIG. 17D is a diagram showing a signal flow for providing video data. The mobile terminal 300 transmits a camera start request to the server 500, e.g., the notify server 500c (Sq1). The server 500, e.g., the notify server 500c, transmits a camera start request to the home appliance 200 (Sq2) and receives a response thereto (Sq3). The response is transmitted to the mobile terminal 300 (Sq4).

The home appliance 200 accesses the server 500, e.g., the media server 500g (Sq5). After connection, the home appliance 200 transmits media data including at least one of video data and audio data to the media server 500g (Sq6).

The mobile terminal 300 transmits an access request to the media server 500a (Sq7) and receives a response thereto (Sq8). If the mobile terminal has accessed the media server, the mobile terminal requests media data from the media server 500g (Sq9). Then, the mobile terminal receives a response thereto (Sq10). The media server 500g transmits the media data to the mobile terminal 300 according to the media data request and the mobile terminal 300 receives the media data (Sq11).

The mobile terminal 300 transmits a camera stop request to the server 500, e.g., the notify server 500c (Sq10). The server 500, e.g., the notify server 500c, transmits the camera stop request to the home appliance 200 (Sq11) and receives a response thereto (Sq12). The response is transmitted to the mobile terminal 300 (Sq13).

Figure 18:
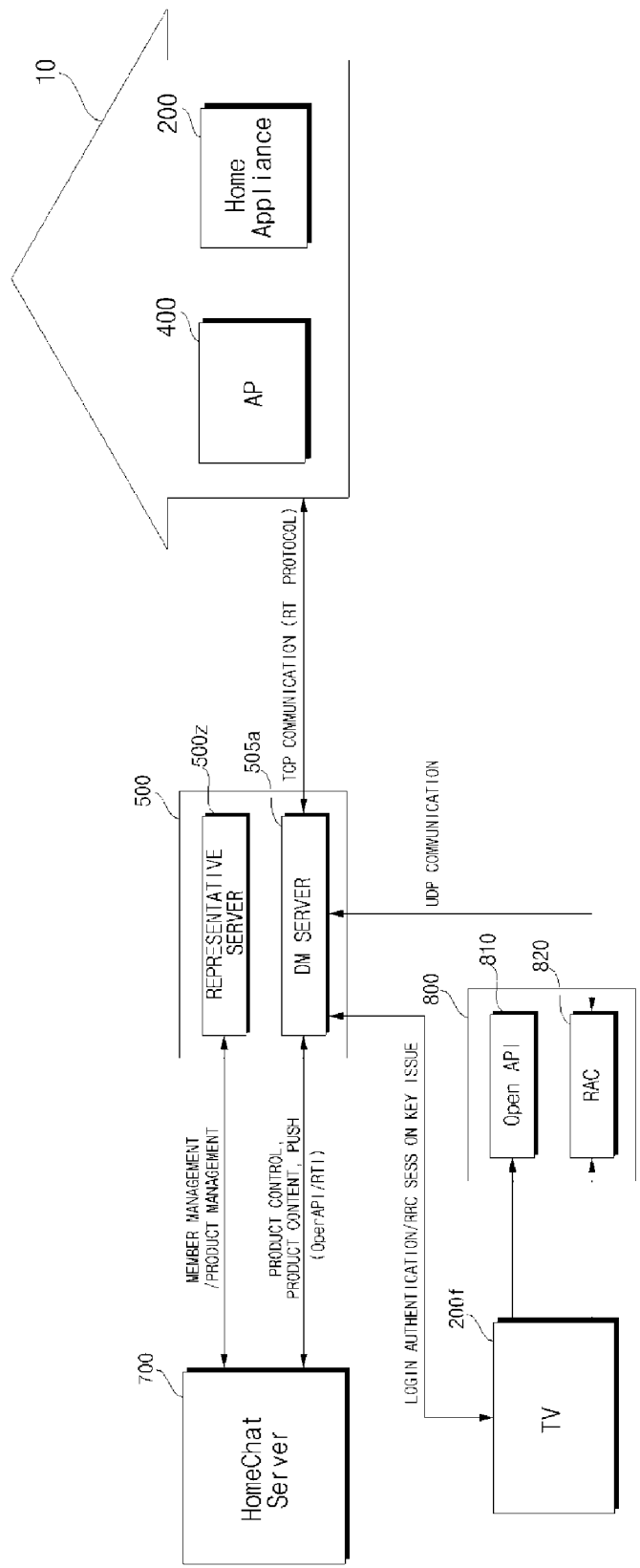
FIG. 18 is a diagram showing a home applicant system capable of providing a messenger function.

FIG. 18 is a diagram showing a home appliance system capable of providing a messenger function. The system may include a home appliance 200, an AP apparatus 400, a first server 500, a second server 800, a chat server 700, a TV 200f, etc.

The home appliance 200 capable of providing the messenger function exchanges data with a DM server 500a of the first server 500 via TCP communication. A representative server 500z or portal server 500d of the first server 500 may exchange member management information or home appliance management information with the chat server 700. The DM server 500a of the first server 500 may exchange control information, content information, push message, etc. of the home appliance using an Open API or RTI method.

The TV 200f may manage the home appliance 200 as a terminal or a chat service. Remote control or monitoring of the TV 200f is possible. The second server 800 for the TV 200f may be separately provided.

The TV 200f may transmit login information to the first server 500, e.g., the DM server 500a, via the Open API to complete login authentication. The first server 500, e.g., the DM server 500a may issue a session key of the second server 800 and transmit session key information of the second server 800 to the TV 200f.

The TV 200f transmits the session key information of the second server 800 to the second server 800. The second server 800 may access the first server 500, e.g., the DM server 500a via the Open API. After connection, the second server 800 and the first server 500 may perform UDP communication.

According to embodiments of the present disclosure, since the server includes a memory, a communication module configured to exchange data with a mobile terminal or a home appliance and a processor configured to receive login information from the mobile terminal based on a first communication mode, to perform login based on the login information, to receive a session maintenance request from the mobile terminal based on a second communication mode after login, and to initialize a session duration according to the session maintenance request, it is possible to control the home appliance in real time via the server.

In particular, since the server provides information about a registered home appliance to the mobile terminal after login, it is possible to control the home appliance in real time via the server.

Since the server assigns control rights to a user or mobile terminal which first performs login and transmits a message indicating "no control rights" to the other users or mobile terminals, it is possible to assign control rights to one user or mobile terminal.

Since the server provides monitoring data to all connected users or mobile terminals, all users or mobile terminals may perform monitoring regardless of control rights.

Since the server may transmit any one of a control command, a monitoring command, a diagnosis command and a software download command for the home appliance from the mobile terminal to the home appliance, it is possible to provide user convenience.

The home appliance according to the foregoing embodiments is not restricted to the embodiments set forth herein. Therefore, variations and combinations of the exemplary embodiments set forth herein may fall within the scope of the present disclosure.

The home appliance according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

In accordance with an aspect of the present disclosure, the above and other objects can be accomplished by the provision of a server including a memory, a communication module configured to exchange data with a mobile terminal or a home appliance and a processor configured to receive login information from the mobile terminal based on a first communication mode, to perform login based on the login information, to receive a session maintenance request from the mobile terminal based on a second communication mode after login, and to initialize a session duration according to the session maintenance request.

In accordance with an aspect of the present disclosure, there is provided a home appliance system including a mobile terminal configured to transmit login information based on a first communication mode and to transmit a session maintenance request based on a second communication mode, a server configured to receive login information from the mobile terminal based on the first communication mode, to perform login based on the login information, to receive the session maintenance request from the mobile terminal based on the second communication mode after login, and to initialize a session duration according to the session maintenance request and a home appliance connected to the server.

The terms "module" and "unit" used in description of components are used herein to aid in the understanding of the components and the terms "module" and "unit" may be used interchangeably.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A server comprising:
   a memory;
   a communication module configured to exchange information with a mobile terminal or a home appliance; and
   a processor configured to receive login information from the mobile terminal based on a first communication mode, to perform login based on the login information, to receive a session maintenance request from the mobile terminal based on a second communication mode after login, and to initialize a session duration according to the session maintenance request,
   wherein the processor determines a connection state of a home appliance according to a remote control request from the mobile terminal and controls transmission of a remote control command to the home appliance based on the second communication mode.

2. The server according to claim 1, wherein the processor determines a registered home appliance stored in the memory and controls transmission of product information, a notify server address for transmission control protocol (TCP) connection and port information to the mobile terminal, after login.

3. The server according to claim 1, wherein the processor provides a notify message for software update to a home appliance according to a software update request from the mobile terminal and controls transmission of uniform resource locator (URL) information for software download to the home appliance according to the software download request from the home appliance.

4. The server according to claim 1, wherein:
   the processor controls transmission of a command to the home appliance according to a camera start request or a camera stop request from the mobile terminal, and
   the memory stores media data of a camera received from the home appliance.

5. The server according to claim 4, wherein the processor controls transmission of the media data to the mobile terminal.

6. The server according to claim 1, wherein the processor initializes a session duration based on the first communication mode, according to the session maintenance request based on the first communication mode from the mobile terminal.

7. The server according to claim 1, wherein:
   the processor performs authentication processing based on login information transmission and transmission of file data stored in the memory, based on the first communication mode, and performs control command delivery and result reception and monitoring data transmission and result reception, based on the second communication mode.

8. The server according to claim 7, wherein the first communication mode is based on an open application programming interface (API) and the second communication mode is based on a real-time interface.

9. The server according to claim 1, wherein the processor controls transmission of a message indicating that the home appliance is operating to the mobile terminal in the first communication mode, upon management of a specific home appliance.

10. The server according to claim 1, wherein the processor controls assignment of control rights to a user or mobile terminal which first performs login, and transmission of a message indicating "no control rights" to the other users or mobile terminals, via the second communication mode.

11. The server according to claim 10, wherein, when the mobile terminal having the control rights logs out, the processor assigns the control rights to a mobile terminal which has first requested a control command among the other mobile terminals.

12. The server according to claim 10, wherein the processor controls transmission of monitoring data to all connected users or mobile terminals.

13. The server according to claim 10, wherein, when the user having the control rights logs out, the processor assigns the control rights to a user which has first requested a control command among the other users.

14. The server according to claim 1, wherein the processor controls transmission of a session ID to the mobile terminal, after login.

15. The server according to claim 1, wherein the processor controls transmission of the session ID and a device list of a manageable home appliance to the mobile terminal, after login.

16. A server comprising:
a memory;
a communication module configured to exchange information with a mobile terminal or a home appliance; and
a processor configured to receive login information from the mobile terminal based on a first communication mode, to perform login based on the login information, to receive a session maintenance request from the mobile terminal based on a second communication mode after login, and to initialize a session duration according to the session maintenance request,
wherein the processor determines whether a home appliance requested by the mobile terminal has been registered or connected to the server according to a home appliance connection state request from the mobile terminal and controls transmission of result information to the mobile terminal.

17. A home appliance system comprising:
a mobile terminal configured to transmit login information based on a first communication mode and to transmit a session maintenance request based on a second communication mode;
a server configured to receive login information from the mobile terminal based on the first communication mode, to perform login based on the login information, to receive the session maintenance request from the mobile terminal based on the second communication mode after login, and to initialize a session duration according to the session maintenance request; and
a home appliance connected to the server.

18. The home appliance system according to claim 17, wherein:
the mobile terminal sends at least one of a control command, a monitoring command, a diagnosis command or a software download command for the home appliance to the server,
the server transmits at least one of the control command, the monitoring command, the diagnosis command or the software download command to the home appliance.

19. The home appliance according to claim 17, wherein the server performs authentication processing based on login information transmission and file data transmission, based on the first communication mode, and performs control command delivery and result reception and monitoring data transmission and result reception, based on the second communication mode.

20. The home appliance according to claim 17, wherein the server assigns control rights to a user or mobile terminal which first performs login, and transmission of a message indicating "no control rights" to the other users or mobile terminals, via the second communication mode.

* * * * *